US012269041B2

(12) United States Patent
Dreizin et al.

(10) Patent No.: US 12,269,041 B2
(45) Date of Patent: Apr. 8, 2025

(54) SPHERICAL COMPOSITE POWDER

(71) Applicant: New Jersey Institute of Technology, Newark, NJ (US)

(72) Inventors: Edward Dreizin, Princeton Junction, NJ (US); Mirko Schoenitz, Princeton, NJ (US); Mehnaz Mursalat, Newark, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1238 days.

(21) Appl. No.: 17/024,949

(22) Filed: Sep. 18, 2020

(65) Prior Publication Data

US 2021/0101157 A1 Apr. 8, 2021

Related U.S. Application Data

(60) Provisional application No. 62/902,437, filed on Sep. 19, 2019.

(51) Int. Cl.

*B02C 23/36* (2006.01)
*B02C 17/18* (2006.01)
*C06B 21/00* (2006.01)
*C06B 33/00* (2006.01)

(52) U.S. Cl.

CPC .............. *B02C 23/36* (2013.01); *B02C 17/18* (2013.01); *C06B 21/0066* (2013.01); *C06B 33/00* (2013.01)

(58) Field of Classification Search

None

See application file for complete search history.

(56) References Cited

U.S. PATENT DOCUMENTS

| | | | |
|---|---|---|---|
| 4,693,864 A | 9/1987 | Lloyd | |
| 8,303,991 B2 | 11/2012 | Staniforth et al. | |
| 2009/0191276 A1 | 7/2009 | Kim et al. | |
| 2015/0086416 A1* | 3/2015 | Anderson ............. | B02C 17/186 420/528 |

FOREIGN PATENT DOCUMENTS

| | | |
|---|---|---|
| JP | 2017150005 A | 8/2017 |
| WO | WO 1995/028435 A1 | 10/1995 |
| WO | WO 2002/000197 A1 | 1/2002 |
| WO | WO 2002/047665 A2 | 6/2002 |
| WO | WO 2002/043701 A3 | 10/2002 |
| WO | WO 2015/071659 A1 | 5/2015 |

(Continued)

OTHER PUBLICATIONS

H.E. Kissinger, "Reaction kinetics in differential thermal analysis", Anal. Chem. 29 (1957), p. 1702-1706.

(Continued)

*Primary Examiner* — Aileen B Felton

(74) *Attorney, Agent, or Firm* — McCarter & English, LLP

(57) ABSTRACT

An example method of preparing spherical composite powders is provided. The method includes introducing one or more starting material powders into an agitation mill. The method includes introducing a process control agent into the agitation mill, the process control agent including at least two immiscible liquids. The method includes agitating and milling the one or more starting material powders and the process control agent with the agitation mill to produce substantially spherical composite powders.

15 Claims, 24 Drawing Sheets

(56) References Cited

FOREIGN PATENT DOCUMENTS

| | | | |
|---|---|---|---|
| WO | WO 2016/203454 | A1 | 12/2016 |
| WO | WO 2017/216667 | A1 | 12/2017 |

OTHER PUBLICATIONS

H.M. Rietveld, "Rietveld method—a historical perspective", Aust. J. Phys. 41 (1988), p. 113-116.
I. Olefjord et al., "Surface analysis of oxidized aluminium. 2. Oxidation of aluminium in dry and humid atmosphere studied by ESCA, SEM, SAM and EDX", Surf. Interface Anal. 21 (1994), p. 290-297.
C. Chen et al., "Measurement of oxide film growth on Mg and Al surfaces over extended periods using XPS", Surf. Sci. 382 (1997), p. L652-L657.
C. Suryanarayana, "Mechanical alloying and milling", Progress in Materials Science 46 (2001 ), p. 1-184.
A. D. Dinsmore et al., "Colloidosomes: Selectively Permeable Capsules Composed of Colloidal Particles", Science (2002), 298, p. 1006.
S. Mell, et al., "Pickering Emulsions with Controllable Stability", Langmuir (2005), 21, p. 2158.
S.M. Umbrajkar et al., "Exothermic reactions in Al—CuO nanocomposites", Thermochim. Acta 451 (2006), p. 34-43.
A. Gharsallaoui et al., "Applications of spray-drying in microencapsulation of food ingredients: An overview", Food Research International 40 (2007), p. 1107-1121.
D. Lee et al., "Double Emulsion-Templated Nanoparticle Colloidosomes with Selective Permeability", Adv. Materials (2008), 20, p. 3498.
C. Suryanarayana, "Recent developments in mechanical alloying", Reviews on Advanced Materials Science 18 (2008), p. 203-211.
R. Vehring, "Pharmaceutical particle engineering via spray drying", Pharmaceutical Research 25 (2008), p. 999-1022.
D. Stamatis et al., "Fully dense, aluminum-rich Al—CuO nanocomposite powders for energetic formulations", Combustion Science and Technology 181 (2009), p. 97-116.
A.B.D. Nandiyanto et al., "Progress in developing spray-drying methods for the production of controlled morphology particles: From the nanometer to submicrometer size ranges", Advanced Powder Technology 22 (2011), p. 1-19.
A. Ermoline et al., "Low-temperature exothermic reactions in fully dense Al—CuO nanocomposite powders", Thermochim. Acta 527 (2012), p. 52-58.
Y. Chevalier et al., "Emulsions Stabilized with Solid Nanoparticles: Pickering Emulsions", Colloids Surf. A (2013), 439, p. 23.
J.S. Sander et al., "Nanoparticle-filled complex colloidosomes for tunable cargo release", Langmuir 29 (2013), p. 15168-15173.
J.W.J. de Folter et al., "Particle shape anisotropy in pickering emulsions: cubes and peanuts", Langmuir 30 (2014), p. 955-964.
J.S. Sander et al., "Multiwalled functional colloidosomes made small and in large quantities via bulk emulsification", Soft Matter 10 (2014), p. 60-68.
B.W. McMahon et al., "Synthesis of nanoparticles from malleable and ductile metals using powder-free, reactantassisted mechanical attrition", ACS Appl. Mater. Interfaces 6 (2014), p. 19579-19591.
T. Degen et al., "The HighScore suite", Powder Diffr. 29 (2014), p. S13-S18.
"Double Emulsions and Colloidosomes-in-Colloidosomes Using Silica-Based Pickering Emulsifiers" M. Williams et al., J. Smets, Langmuir (2014), 30, p. 2703.
C. P. Whitby et al., "Controlling Pickering Emulsion Destabilisation: A Route to Fabricating New Materials by Phase Inversion", Materials (2016), 9, p. 626.
J. Yu et al., "Aluminum Nanoparticle Production by Acetonitrile—Assisted Milling: Effects of Liquid- vs Vapor-Phase Milling and of Milling Method on Particle Size and Surface Chemistry" Phys. Chem. C (2016), 120, p. 19613.
K. L. Chintersingh et al., "Oxidation Kinetics and Combustion of Boron Particles with Modified Surface" Combust. Flame (2016), 173, p. 288.
Y. Yang et al., "An overview of pickering emulsions: solid-particle materials, classification, morphology, and applications", Front. Pharmacol. 8 (2017), p. 287.
Q. Nguyen et al., "Nanocomposite Thermite Powders with Improved Flowability Prepared by Mechanical Milling" Powder Technol. (2018), 327, p. 368.
X. Liu et al., "Combustion of Mg and Composite MgS Powders in Different Oxidizers", Combust. Flame (2018), 195, p. 292.
C. Griffith et al., "Destabilizing Pickering Emulsions Using Fumed Silica Particles with Different Wettabilites", J. Colloid Interface Sci.(2019), 547, p. 117.
M. Mursalat, et al., "Composite Al. Ti powders prepared by high-energy milling with different process controls agents", Adv. Powder Technol. (2019), vol. 30, Issue 6, p. 1319.

* cited by examiner

100

100

Compositions of mixed solvents used for preparation of 8Al·3CuO nanocomposite powders.

| Acetonitrile volume fraction (balance is Hexane) | Sample ID |
|---|---|
| 100% | A100 |
| 75% | A075 |
| 50% | A050 |
| 25% | A025 |
| 12.5% | A012 |
| 6.25% | A006 |
| 0% | A000 |

FIG. 10

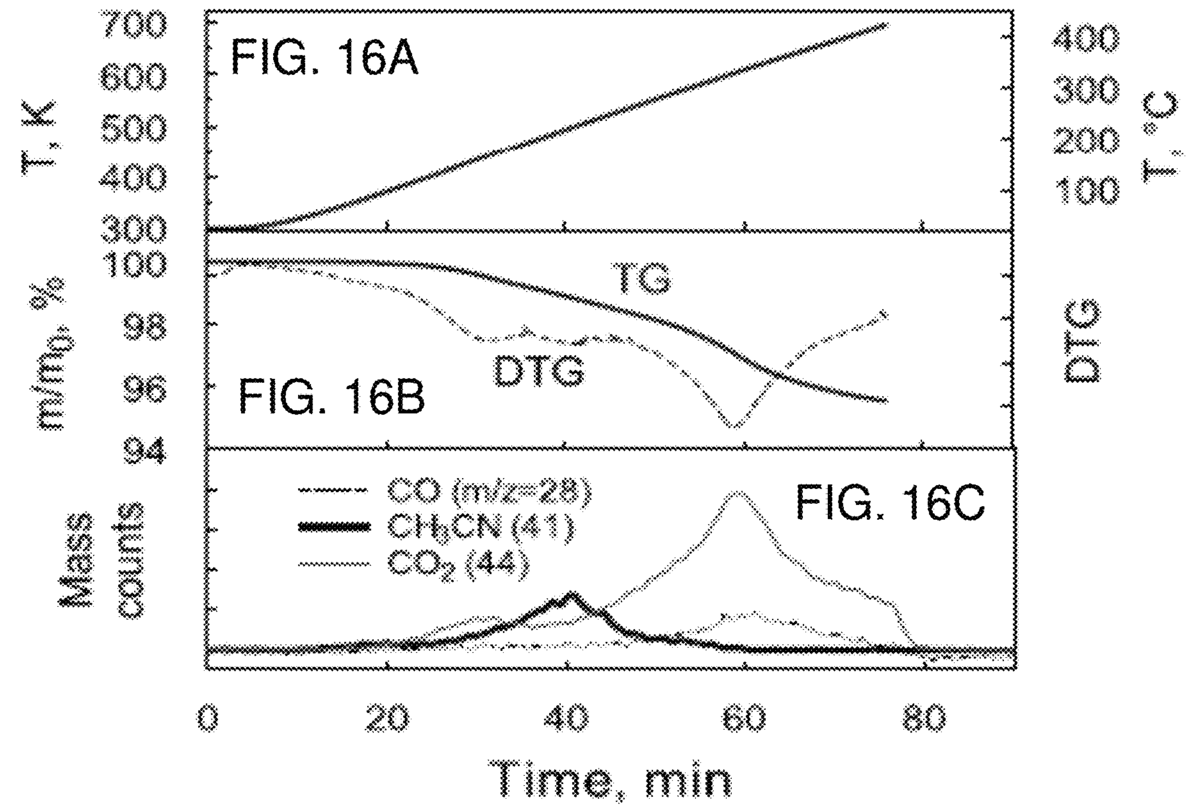
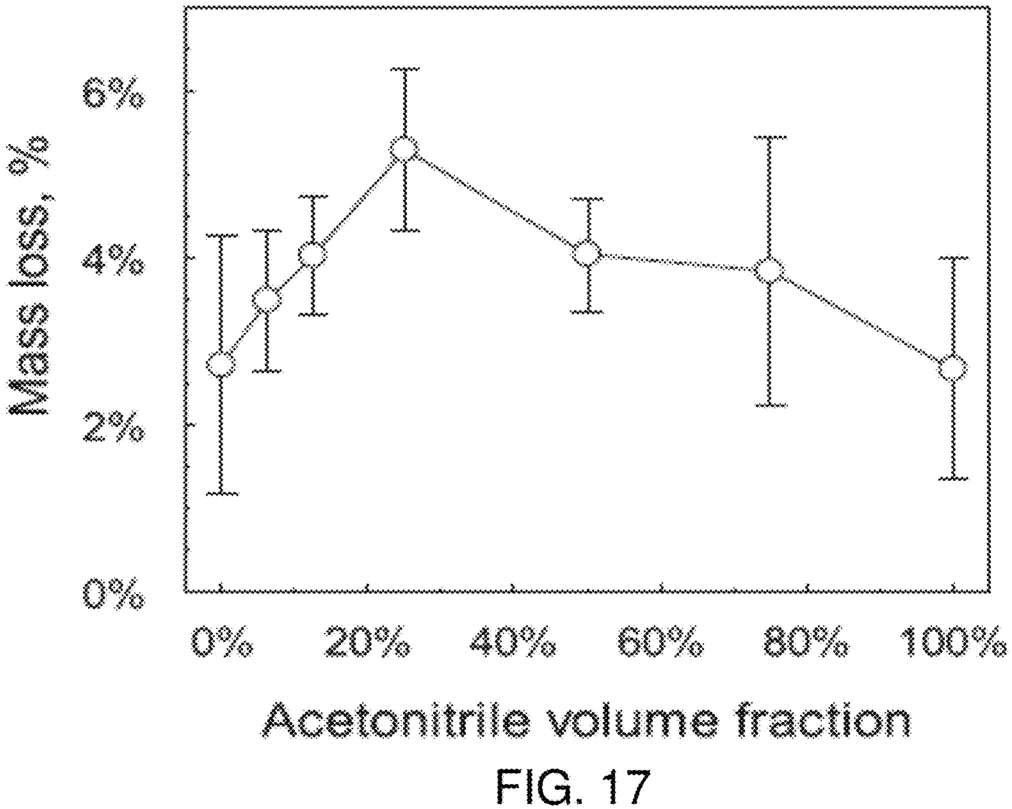
FIG. 17

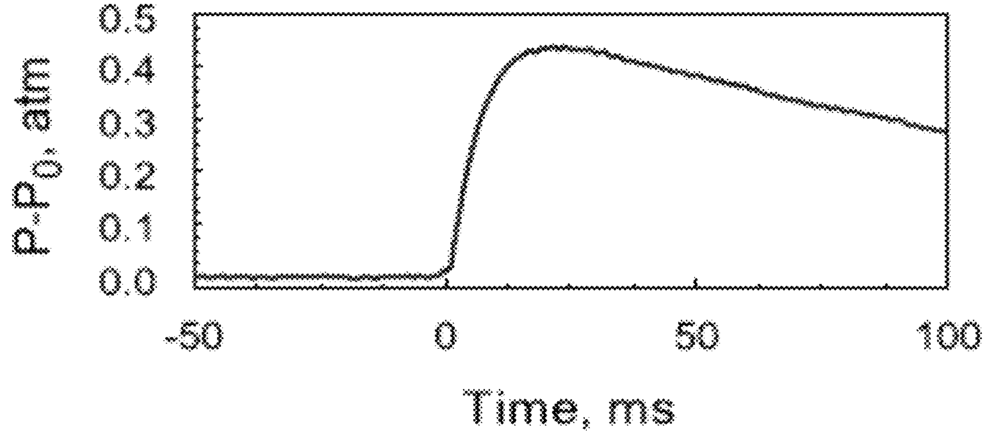
FIG. 21
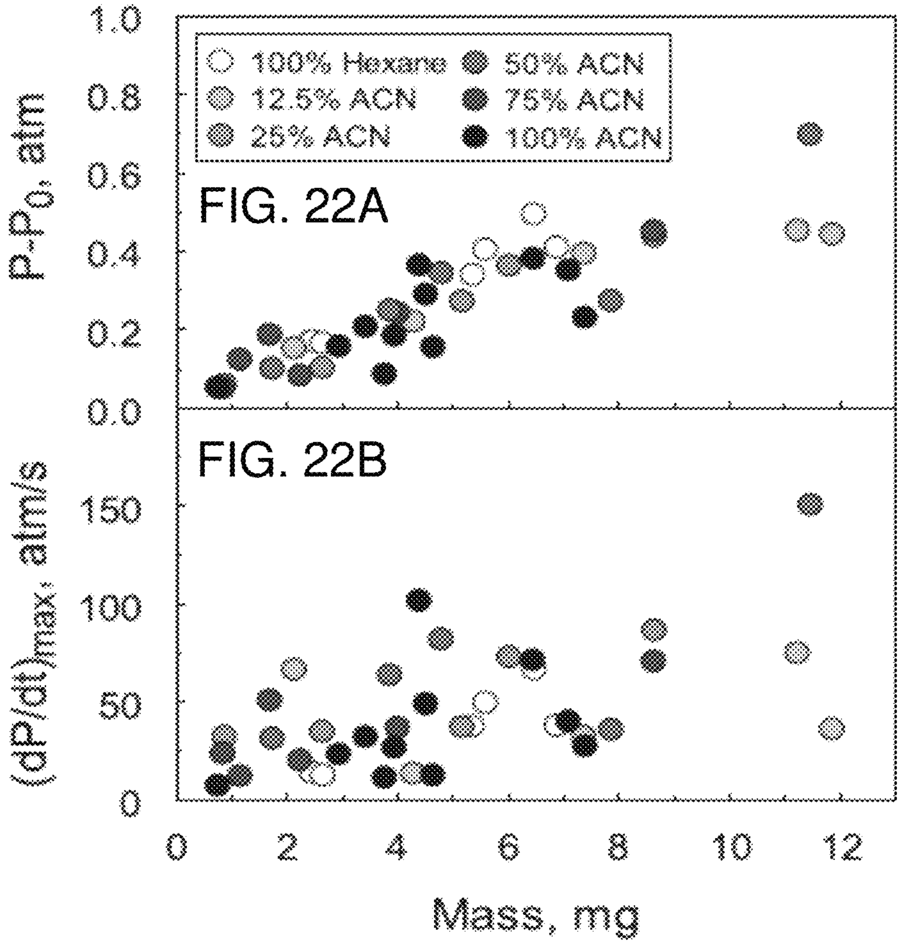

SPHERICAL COMPOSITE POWDER

CROSS-REFERENCE TO RELATED APPLICATIONS

This application claims the benefit of U.S. Provisional Patent Application No. 62/902,437, which was filed on Sep. 19, 2019. The entire content of the foregoing provisional patent application is incorporated herein by reference.

STATEMENT REGARDING FEDERALLY SPONSORED RESEARCH

This invention was made with government support under Agreement No. FA9550-16-1-0266 awarded by the U.S. Air Force Office of Scientific Research. The government has certain rights in the invention.

FIELD OF THE DISCLOSURE

The present disclosure relates to spherical composite powder and, in particular, to spherical composite powder prepared using ball milling.

BACKGROUND

Spherical particles or micro particles can be formed by a variety of processes and are used in a variety of industries. In some instances, spherical micro particles of inorganic materials may be prepared by cooling droplets of respective melts (see, e.g., Y. Hayashi, et al., Method and apparatus for production of metal particles for solder paste, Tohoku University, Japan; Panasonic Corp. (2017), p. 17; and J. Zhu, et al., A kind of high-efficiency preparing superfine spherical metal particle method and apparatus for Machine Translation, Zhangjiagang Cobo Metal Technology Co., Ltd., Peop. Rep. China (2018), p. 7). Such process can make it difficult or impossible to work with refractory compounds or with composites comprising components with diverse melting temperatures. Such process can also makes it impossible to work with materials that are sensitive to heating, and materials for which the structure or morphology may be destroyed by heating the materials to elevated temperatures involving melting. As such, most energetic materials or materials used to prepare pharmaceutical formulations cannot be processed by such traditional methods.

Another traditional process of making spherical powders can involve spray drying (see, e.g., A. Gharsallaoui, et al., Applications of spray-drying in microencapsulation of food ingredients: An overview, Food Research International 40 (2007), p. 1107-1121; R. Vehring, Pharmaceutical particle engineering via spray drying, Pharmaceutical Research 25 (2008), p. 999-1022; and A. B. D. Nandiyanto, et al., Progress in developing spray-drying methods for the production of controlled morphology particles: From the nanometer to submicrometer size ranges, Advanced Powder Technology 22 (2011), p. 1-19). Spray drying can include the main steps of atomization of a suspension or a slurry, droplet to particle conversion, and collection of produced particles. Achieving a narrow size distribution can be difficult in practical configurations, and generally pre-treatment of the precursor powder by milling is needed to reduce the particle size. The process typically uses large amounts of solvents and consumes significant energy required to heat and evaporate the solvent. Thermal treatment involved in spray drying can also make it difficult to apply the process to thermally sensitive materials.

One traditional process of producing fine powders of particles or pharmaceutical agents involves ball milling (see, e.g., U.S. Pat. No. 4,693,864; and J. N. Staniforth, et al. Preparation of particles for pharmaceutical compositions, Vectura Limited, UK (2002), p. 38). Ball mills typically reduce the size of particles through attrition and impact. Generally, ball milling aimed to prepare mechanically alloyed or composite powders can be performed in the presence of process control agents (PCA), that are solid or liquid additives used to minimize cold welding, improve flowability of the powders, and (sometimes) serve as a heat sink removing the heat from chemically reacting materials (see, e.g., C. Suryanarayana, Mechanical alloying and milling, Progress in Materials Science 46 (2001), p. 1-184; and C. Suryanarayana, Recent developments in mechanical alloying, Reviews on Advanced Materials Science 18 (2008), p. 203-211). Stearic acid is commonly used as a solid PCA additive, and hexane is commonly used as a liquid PCA additive for ball milling.

In a traditional ball milling process, starting component powders are loaded into the milling vials, along with PCA and milling media (e.g., balls). The milling media is agitated and the product is formed after a period of milling. The agitation of the milling media occurs differently in different types of mills. For example, shaker mills typically shake the vials with the powders and milling media the vials are spun in planetary mills, and an impeller is used to move the milling media in attritors. Resulting products are typically powder particles with the starting components mixed on the atomic or nano-scale. Particle shapes are typically rock-like, and particles form as a result of repeatable deformation, pressing, and kneading of the starting powders by the milling media. Generally, products with the same compositions can be produced in different types of mills when the milling conditions are selected properly.

Composite spherical particles have been prepared using milling (see, e.g., Y.-H. Chang, et al., Preparation of powder coating compositions by milling and agglomeration to give spherical particles, Eastman Chemical Co., USA (1995), p. 27). However, the previous approach of preparing composite spherical particles using milling is generally limited to materials including curable resins and cross-linking agents. Such traditional process involves multiple post-processing steps, such as agglomeration of the milled powders and curing of the produced agglomerates.

Another type of composite spherical particles (referred to as colloidosomes) can be prepared by curing or drying a Pickering emulsion (see, e.g., A. Bausch, et al., Colloidosomes for encapsulating active agents, President and Fellows of Harvard College, USA (2002), p. 58; H. Casanova, et al., Method for producing colloidosome microcapsules, Universidad de Antioquia UDEA, Colombia; Nexentia S.A.S. (2016), p. 56; N. Chopra, et al., Nano-architectured colloidosomes for controlled and triggered release, SABIC Global Technologies B.V., Neth. (2017), p. 63; P. Keen, et al., Novel composition for encapsulation of small molecules, such as enzymes, Cambridge Enterprise Limited, UK (2015), p. 55; and J.-W. Kim, et al., Colloidosomes with tunable properties, comprising shell of colloidal particles on core material, and methods for making colloidosomes having tunable properties, S. Korea (2009), p. 28). Such process generally involves an emulsion that is stabilized by solid particles that adsorb onto the interface between two immiscible liquid phases.

Typically, the particles absorbed to the interface of two liquids are energetically stabilized due to the specific solid-liquid interaction. This interaction immobilizes particles at the interface such that the particles cannot easily be removed by thermal effects or acoustic agitation used to emulsify the liquid. Upon drying, the particle-stabilized emulsions may form hollow capsules with shells formed by agglomerated particles. The shells may be further reinforced by sintering or other post-processing. Filled colloidosomes have been formed by using double emulsions (see, e.g., J. S. Sander, et al., Nanoparticle-filled complex colloidosomes for tunable cargo release, Langmuir 29 (2013), p. 15168-15173). In such filled colloidosome particles, the filler material is generally dispersed at a low density inside a thin shell. The density of filling is low and the types of particles that can be incorporated into such colloidosomes are generally limited to those having specific energy of interaction with the suspending liquids, making it possible to trap the particles in double emulsion droplets. Each of the traditional processes for producing spherical particles therefore has certain limitations.

SUMMARY

In accordance with embodiments of the present disclosure, exemplary methods to prepare spherical composite powder are provided. As discussed herein, the term "composite" or "composite powder" refers to a powder made of compacted primary particles, with the primary particles representing one or more individual materials or material components. In some embodiments, the spherical composite powders can be prepared without melting or heating any of the material components (e.g., without heating or melting starting materials and/or intermediate products). In some embodiments, the composite powders can be prepared by ball milling.

The exemplary method of preparing spherical composite powders discussed herein is fundamentally different from traditional spray drying. In particular, powder milling is one step for the processing of precursor powders, and no thermal treatment is performed or required. In the exemplary method, packing density is tunable (by varying milling parameters), and the final particle size distributions are narrow. In addition, the effect of the process control agent in the exemplary method is unique and different than in traditional ball milling operations. In some embodiments, the process control agent used can include two immiscible liquids.

In accordance with embodiments of the present disclosure, an exemplary method of preparing spherical composite powders is provided. The method includes introducing one or more starting material powders into an agitation mill. The method includes introducing a process control agent into the agitation mill. The process control agent can include at least two immiscible liquids. The method includes agitating and milling the one or more starting material powders and the process control agent with the agitation mill to produce spherical or substantially spherical composite powders.

In some embodiments, the agitation mill can be a ball mill, and the method includes introducing one or more milling balls as a milling media into the ball mill. In some embodiments, the one or more starting material powders and the process control agent can be introduced into a milling vial of the ball mill. In some embodiments, the process control agent can include at least two immiscible liquids that are different from each other. In some embodiments, the at least two immiscible liquids can be selected from, e.g., water and oil, acetonitrile and hexane, acetonitrile and heptane, acetic acid and pentane, acetic acid and hexane, or the like. In some embodiments, a first of the at least two immiscible liquids can be polar, and a second of the at least two immiscible liquids can be non-polar.

In some embodiments, the agitation mill can be at least one of a shaker mill, a planetary mill, or an attritor mill. Interaction between the at least two immiscible liquids during agitation and milling with the agitation mill forms an emulsion within the agitation mill. The method can include varying a composition of the at least two immiscible liquids prior to agitation and milling. The method can include varying a liquid-to-solid mass ratio between the one or more starting materials and the at least two immiscible liquids. In some embodiments, the method can include varying the time of agitation or milling. In some embodiments, the method can include varying the agitation intensity (e.g., varying a rotation rate of milling vials in a planetary mill, varying a rotation rate of an impeller in an attritor mill, or the like). The method can include introducing a surfactant into the agitation mill to tune a surface energy of the at least two immiscible liquids forming an emulsion during agitation and interacting with the one or more starting material powders.

During agitation and milling with the agitation mill, emulsion droplets are filled with the one or more starting material powders. In some embodiments, a volume of one of the at least two immiscible liquids that forms droplets in the emulsion is equal or substantially equal to a volume of the one or more starting material powders in the agitation mill. In some embodiments, a volume of one of the at least two immiscible liquids that forms a continuous phase in the emulsion is greater than a volume of the one or more starting material powders in the agitation mill.

In some embodiments, the one or more starting material powders are inorganic precursor powders. In some embodiments, the one or more starting material powders are organic precursor powders. In some embodiments, the one or more starting material powders are a combination of inorganic and organic precursor powders. In some embodiments, at least one of the at least two immiscible liquids can include a dissolved component that can serve as a binder to improve the mechanical strength of the prepared spherical composite powders. In some embodiments, at least one of the at least two immiscible liquids can include a dissolved component that can serve to physically, chemically, or biologically functionalize the surface of the prepared spherical composite powders.

In accordance with embodiments of the present disclosure, an exemplary method of preparing spherical composite powders is provided. The method includes introducing one or more starting material powders into an agitation ball mill. The method includes introducing one or more balls as a milling medium into the agitation ball mill. The method includes introducing a process control agent into the agitation ball mill, the process control agent including at least two immiscible liquids that are different from each other. The method includes agitating and milling the one or more starting material powders and the process control agent with the agitation ball mill to produce spherical or substantially spherical composite powders. The one or more starting material powders are at least one of inorganic precursor powders, organic precursor powders, or a combination of inorganic and organic precursor powders.

In accordance with embodiments of the present disclosure, an exemplary spherical composite powder prepared by the following process is provided. The process includes introducing one or more starting material powders into an agitation mill, introducing a process control agent into the agitation mill, the process control agent including at least two immiscible liquids, and agitating and milling the one or more starting material powders and the process control agent with the agitation mill to produce spherical or substantially spherical composite powders.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed spherical composite powder and associated systems and methods, reference is made to the accompanying figures, wherein:

FIG. 10 shows compositions of mixed solvents used for preparation of 8Al-3CuO nanocomposite powders for experimentation.

FIGS. 16A, 16B and 16C show TG and MS results for composite milled with 25% ACN, heated to 800° C. at 5K/min.

FIG. 17 shows mass loss encountered by samples heated in Ar to 1073 K at different rates as a function of the volume fraction of ACN used in PCA.

FIG. 21 shows a pressure trace for 8.64 mg of a composite milled with 25% ACN in a constant volume explosion (CVE) experiment.

FIGS. 22A-22B show peak CVE pressures and peak pressurization rates vs. sample mass.

DETAILED DESCRIPTION

Exemplary embodiments are directed to a spherical composite powder and systems and methods of producing the spherical composite powder. The systems and methods use ball milling to produce or prepare the exemplary spherical composite powder. Although discussed herein with respect to a spherical composite thermite powder, it should be understood that the exemplary methods of producing the spherical composite thermite powder can be applied to other spherical composite powders or pharmaceutical agents. In some embodiments, other spherical composite powders or pharmaceutical agents can include, e.g., powdered catalysts, powdered materials serving as components of pharmaceutical formulations (such as active pharmaceutical ingredients), fillers, binders, powdered materials serving to absorb or desorb moisture, powdered fillers for printing inks, powdered fuels or oxidizers, powdered colorants, food items, or the like. The powder produced by the exemplary method can be used for different material-intensive industries, including the pharmaceutical industry, energetic materials, catalytic materials, energy-storage materials, functional materials, diverse powders for additive manufacturing, and other industries. The spherical composite powder can also be used in, e.g., the defense industry, the pharmaceutical industry, the chemical industry, the cosmetics industry, the food/beverage industry, or the like.

The exemplary spherical composite powder can be formed from a wide range of materials (e.g., composites, organic, inorganic, soft, hard, combinations thereof, or the like). The particle size of the spherical composite powders can be tunable based on the controllable process conditions (e.g., between about 1 μm and about 100 μm). The resulting spherical composite powders provide for narrow size distribution, excellent flowability (e.g., spheres roll, no clogging), and improved chemistry reactivity by controlled porosity. The production process also uses mechanical milling (e.g., inexpensive commercial equipment), allowing for a cost effective process that is scalable, versatile, and is performed without any thermal treatment.

Figure 1:
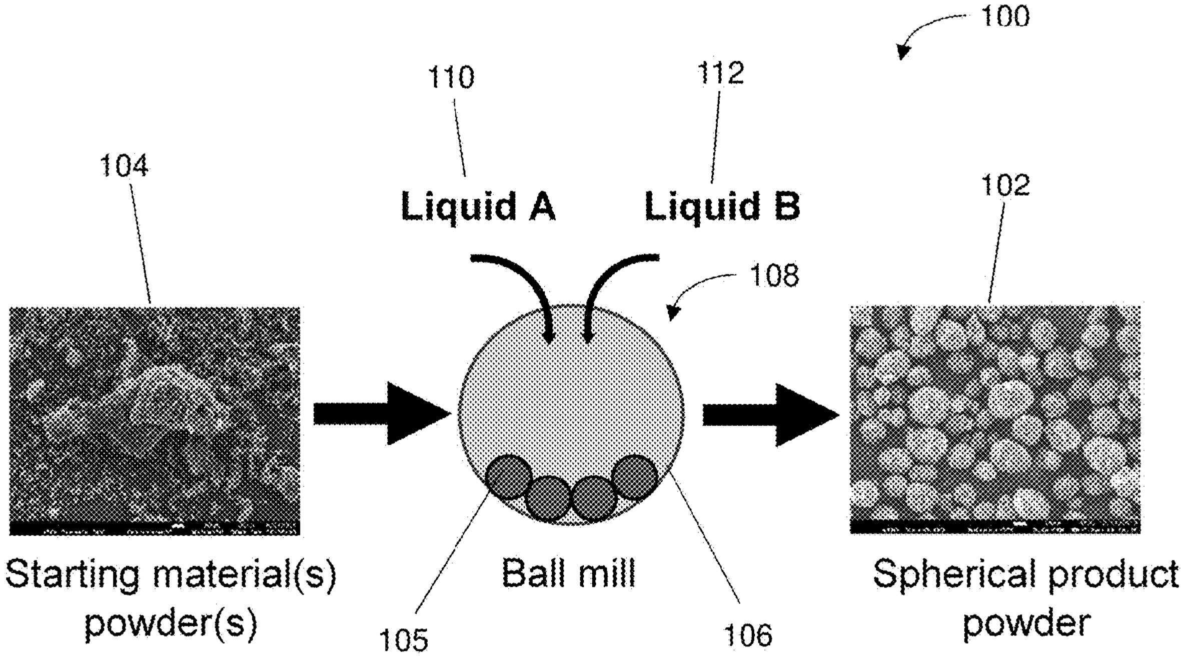
FIG. 1 is a diagrammatic process of producing an exemplary spherical composite powder in accordance with the present disclosure.

FIG. 1 is a diagrammatic view of an exemplary process 100 for preparing a spherical composite powder 102. To begin, one or more starting material powders 104 can be loaded into a milling vial 106 of ball mill 108. In some embodiments, the one or more starting material powders 104 can be inorganic materials, such as elemental metals, semiconductors, or metalloids, oxides, carbides, nitrides, combinations thereof, or the like. In some embodiments, the one or more starting material powders 104 can be organic materials, including polymers or mixtures of organic and inorganic materials. In some embodiments, the one or more starting material powders 104 can include, e.g., boron, aluminum, iron oxide, copper oxide, melamine, a blend of boron and titanium, carbon, sugar, combinations thereof, or the like.

The milling vial 106 includes balls 105 for milling the powders 104. In some embodiments, two immiscible liquids 110, 112 are added to the milling vial 106. The immiscible liquids 110, 112 form or define a process control agent. In some embodiments, two or more immiscible liquids can be added to the milling vial 106. The immiscible liquids 110, 112 are different from each other. In some embodiments, the immiscible liquids 110, 112 can be, e.g., water and oil, acetonitrile and hexane, acetonitrile and heptane, acetic acid and pentane, acetic acid and hexane, or the like. It should be understood that other similarly immiscible liquids can also be used. Generally, one liquid is polar (e.g., like water or acetonitrile) and the other liquid is non-polar (e.g., like hexane, heptane, or oil). Selection of specific immiscible liquids can be made depending on their specific interaction with the surface of the solid components of the composite being prepared. The amount of each immiscible liquid 110, 112 added to the milling vial 106 is selected to generate emulsion upon mechanical agitation. The amounts used for the immiscible liquid 110, 112 can depend on the size of the milling vial 106. For example, for a 375 mL volume milling vial 106, 20 mL of hexane and 5 mL of acetonitrile can be used. Such emulsion co-exists with the suspended powder 104.

During milling, the emulsion droplets can become filled with the powder 104 particles. In some embodiments, the volume of the liquid 110, 112 that forms droplets in the emulsion can be the same or substantially close to the volume of the solid power or powders 104 loaded into the milling vial 106. In some embodiments, the volume of the liquid 110, 112 that forms a continuous phase in the emulsion can be greater than the volume of the solid powder or powders 104 loaded into the milling vial 106. Adjusting the volumes of the liquid 110, 112 used as the process control agent can enable one to control sizes of the emulsion droplets formed during milling, and thereby adjust the particle sizes of the produces spherical composite powders. In some embodiments, acetonitrile can be used as the liquid forming the emulsion droplets and hexane can be used as the liquid forming the continuous phase. In some embodiments, acetonitrile can be used as the liquid forming the continuous phase and hexane can serve as the liquid forming the emulsion droplets.

During agitation in the ball mill 108, the two immiscible liquids 11, 112 generate an emulsion. In some embodiments, acoustic agitation can be similarly provided to generate an emulsion or can be used as a supplement to agitation with the ball mill 108. Suspended droplets and matrix liquid interact differently with the solid material (e.g., the solid powder or powders 104) being milled. For example, if the suspended droplets wet the surface of the solid powder 104 and the matrix liquid does not, the solid powder 104 accumulates inside of the suspended droplets. In some embodiments, the suspended powder may be wetted by both liquids. In such embodiments, the powder particles can initially accumulate at the droplet/continuous phase interfaces. Upon agitation, particles can continuously penetrate inside of the droplets and accumulate there. Different types of liquid-solid interaction may necessitate adjusting the milling conditions, such as the milling time, agitation intensity, and/or the mass loads of both the starting material and process control agent into the agitation mill, in order to control the sizes and porosities of the prepared spherical composite powders. After milling in the ball mill 108, the spherical product powder 102 is produced.

Figure 2A:
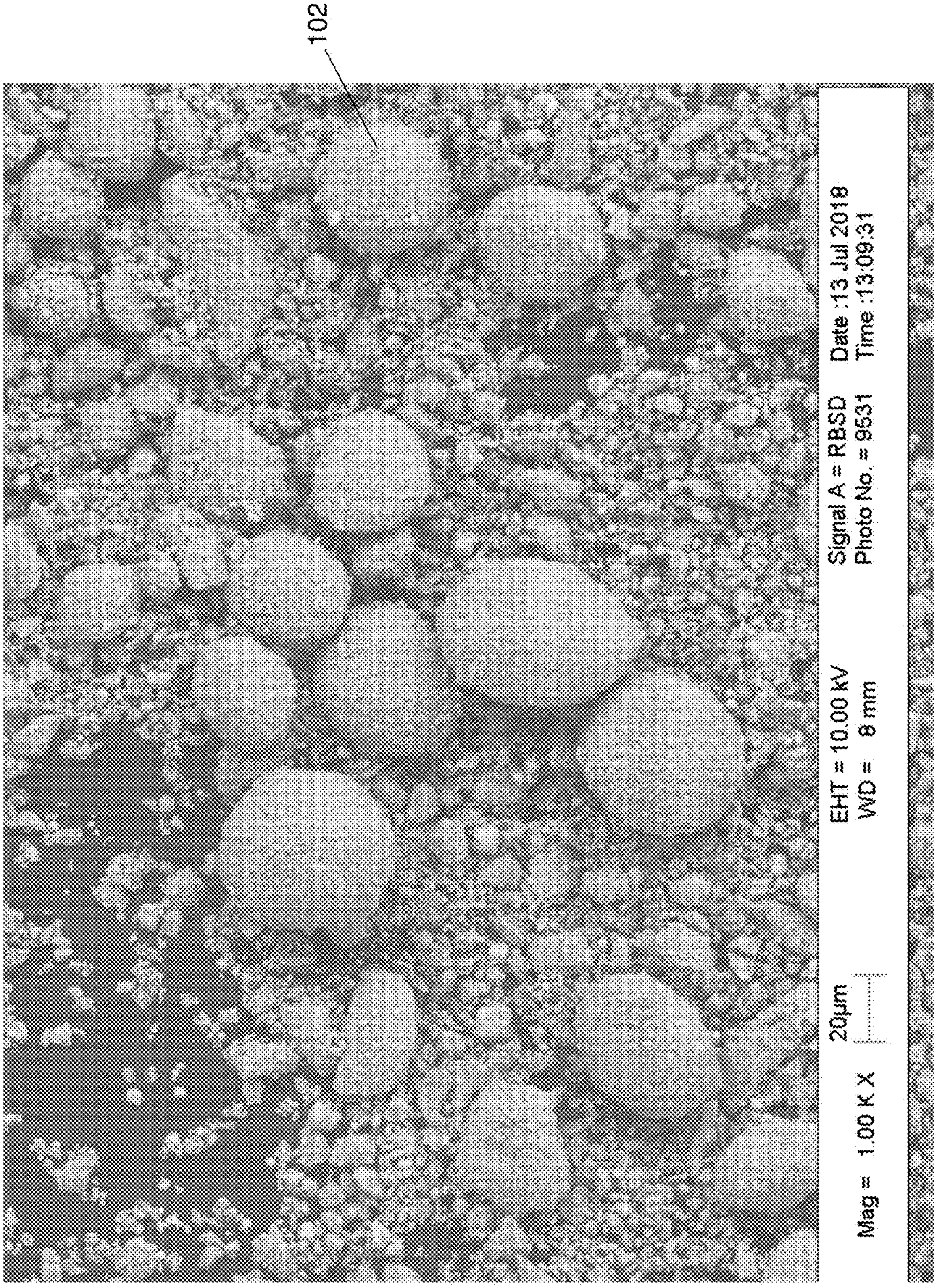
FIG. 2A is a scanning electron microscope image of an exemplary spherical composite powder with a powder composition including Al and CuO at a 1,000× magnification.
Figure 2B:
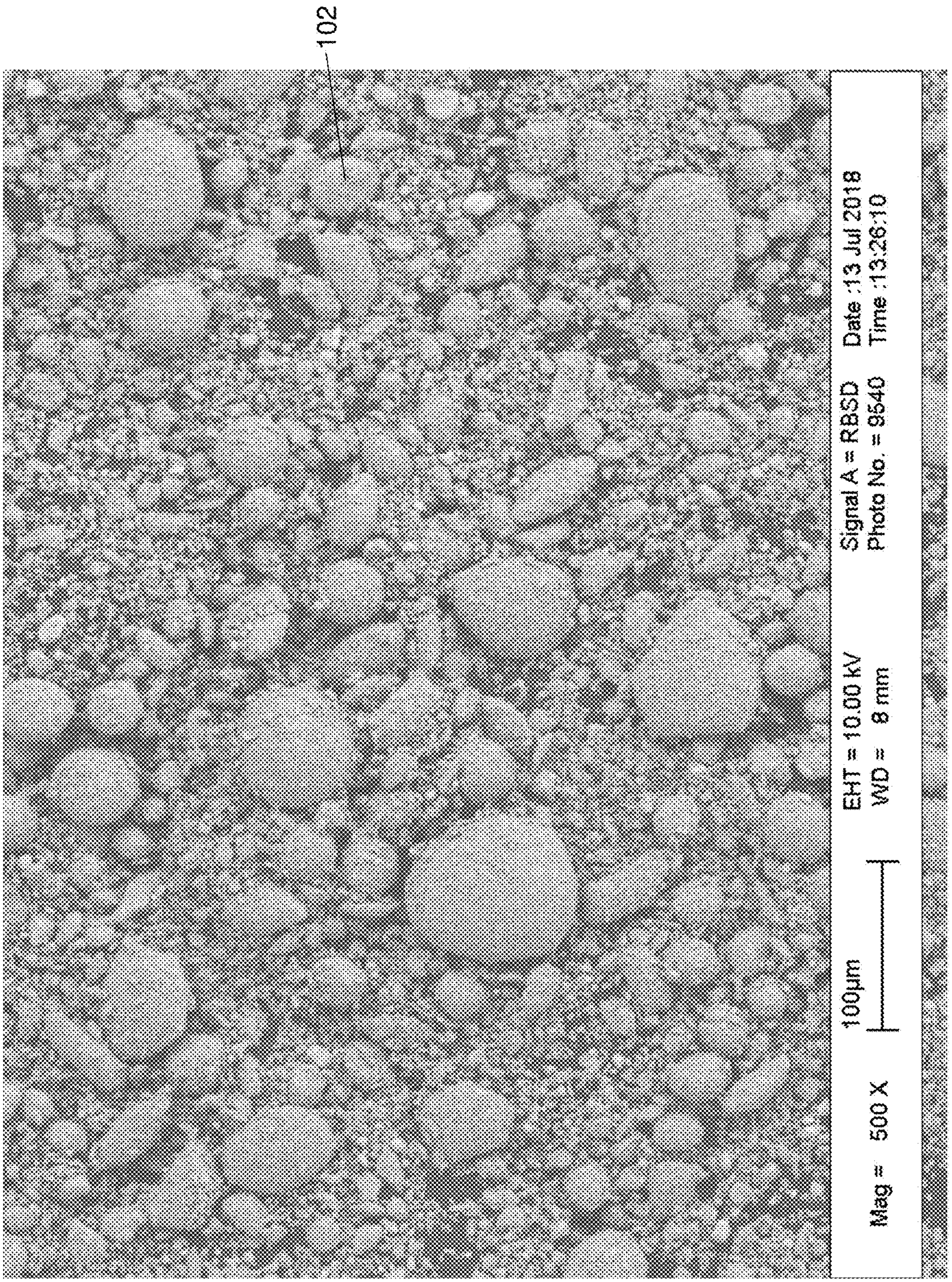
FIG. 2B is a scanning electron microscope image of an exemplary spherical composite powder of FIG. 2A at a 500× magnification.

FIG. 2A is a scanning electron microscope image of an exemplary spherical composite powder 102 with a powder composition including Al and CuO at a 1,000× magnification, and FIG. 2B is a scanning electron microscope image of an exemplary spherical composite powder 102 of FIG. 2A at a 500× magnification. The spherical composite powder 102 of FIGS. 2A and 2B was produced using the process 100 of FIG. 1. The different magnifications show the different size of the spheres produced by the process 100. In general, the size of the spheres in the spherical composite powder 102 can range between e.g., about 1 μm and about 100 μm. The size of the spherical composite powder 102 can depend on the application of such powder 102. For example, for printing inks or for fuels or energetic materials, larger powder 102 sizes may be preferred. As a further example, for food items or cosmetic products, powders 102 having a size in the tens or hundreds of micron diameter may be preferred.

Figure 3A:
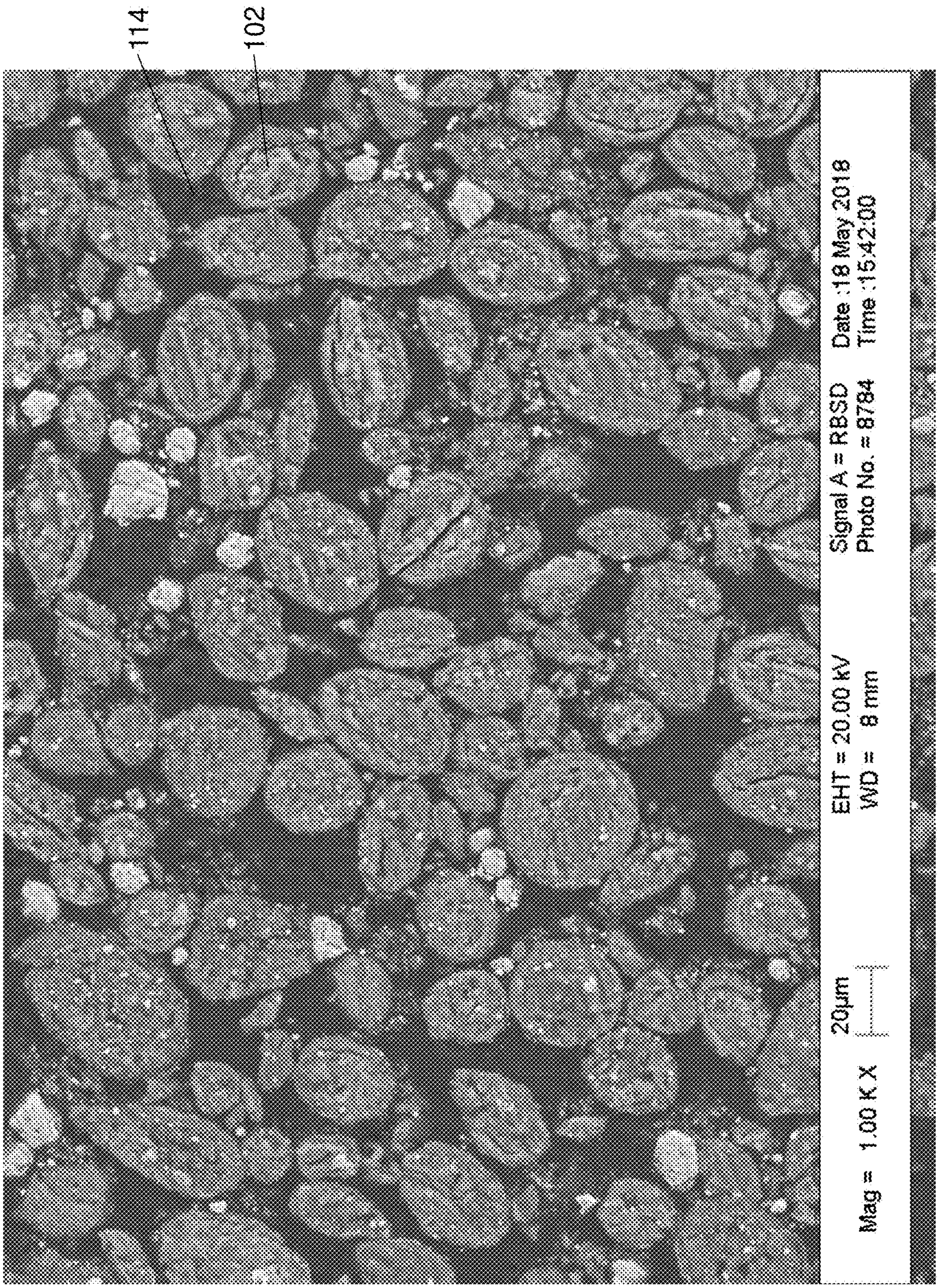
FIG. 3A is a scanning electron microscope image of a cross-section of an exemplary spherical composite powder with a powder composition including Al and CuO at a 1,000× magnification.
Figure 3B:
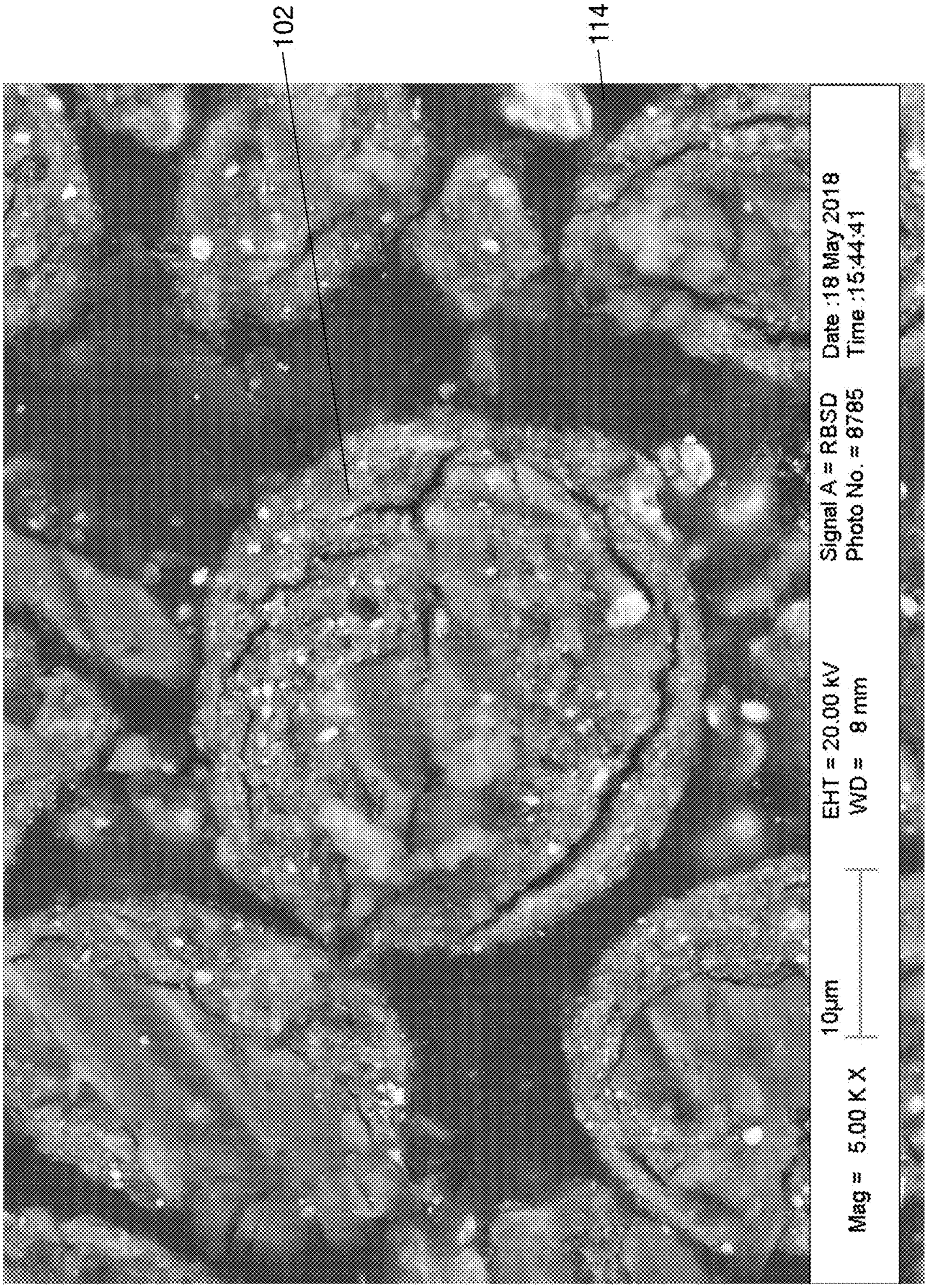
FIG. 3B is a scanning electron microscope image of a cross-section of an exemplary spherical composite powder of FIG. 3A at a 5,000× magnification.

FIG. 3A is a scanning electron microscope image of a cross-section of an exemplary spherical composite powder 102 with a powder composition including Al and CuO at a 1,000× magnification, and FIG. 3B is a scanning electron microscope image of a cross-section of an exemplary spherical composite powder 102 of FIG. 3A at a 5,000× magnification. The starting material powder or particles were embedded in the epoxy during production, and subsequently cross-sectioned. The black matrix 114 (e.g., darker areas) of FIGS. 3A and 3B is the epoxy. The cross-section of the composite structure of the prepared spherical particle includes CuO as the light inclusions and Al as the dark material.

Figure 4:
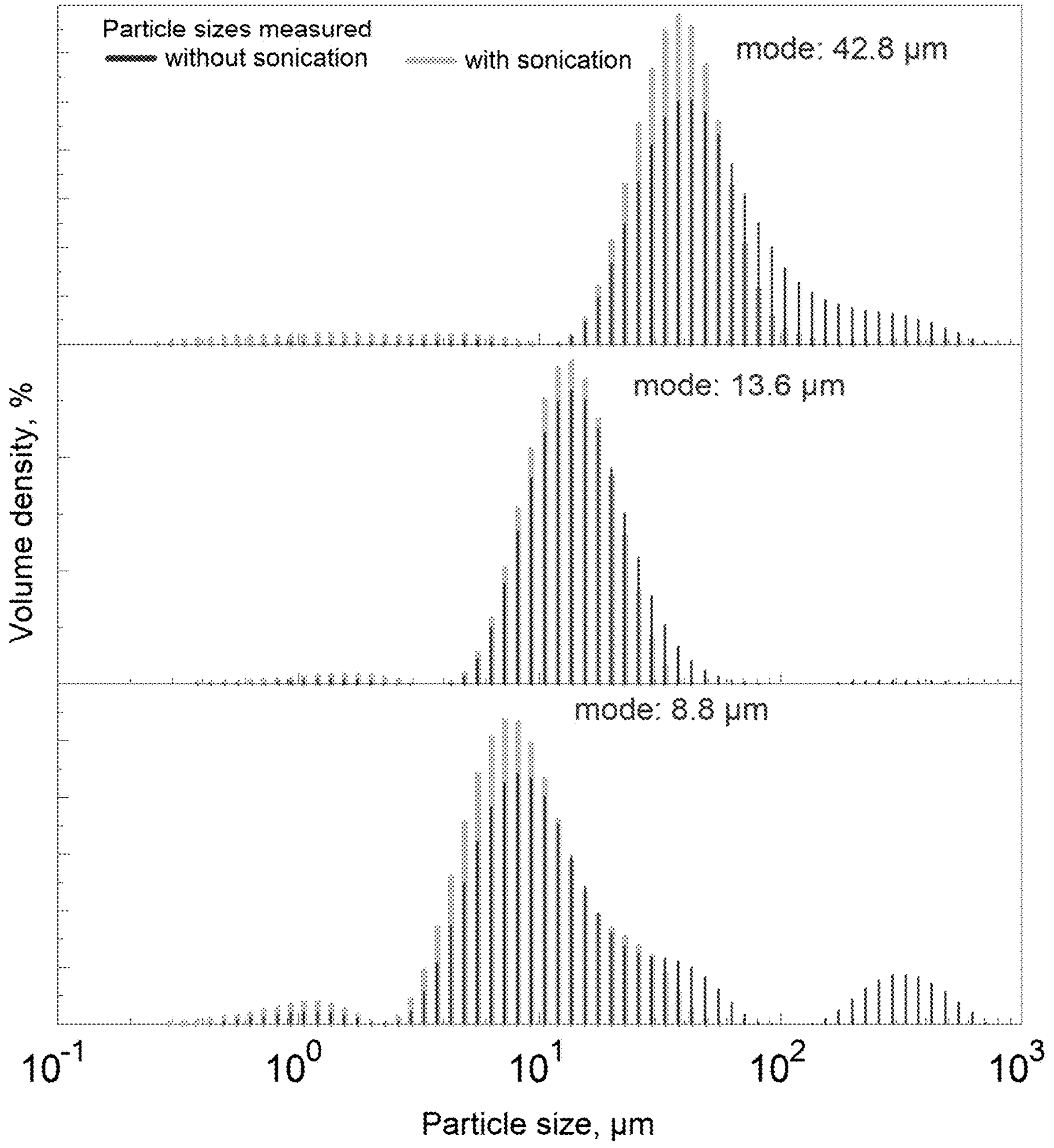
FIG. 4 is a diagram of particle size distribution measured by low-angle laser light scattering for 42.8 μm, 13.6 μm and 8.8 μm samples of boron spherical particles.

FIG. 4 is a diagram of particle size distribution measured by low-angle laser light scattering for 42.8 μm, 13.6 μm and 8.8 μm samples of boron spherical particles. FIG. 4 shows the particle size measured with and without sonication (e.g., agitation). During production, milling conditions or parameters were varied to adjust the resulting size of the forming particles. The particles of FIG. 4 were prepared and reinforced with 0.5% of Viton dissolved in acetonitrile, which was used as one of the liquids during milling. During particle size measurements, the ultrasonic agitation was turned on and off. Experimentation showed that if the prepared spherical powders are mechanically unstable, they can be partially destroyed by the ultrasound. In the examples shown, the effect of ultrasonic agitation is negligible, which serves as evidence of the mechanical strength of the prepared spherical particles.

Figure 5A:
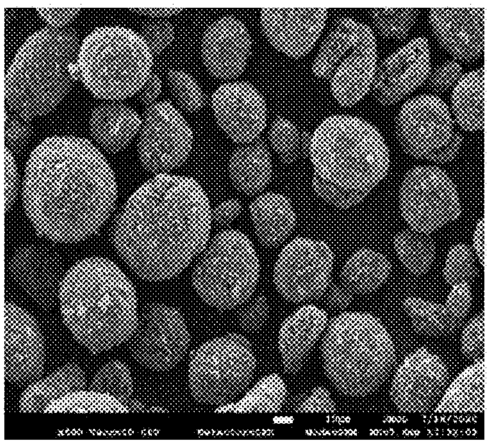
FIG. 5A is a scanning electron microscopic image for a 42.8 μm sample of boron spherical particles of FIG. 4.
Figure 5B:
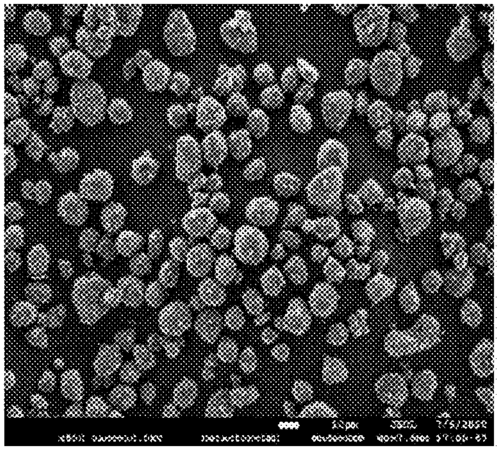
FIG. 5B is a scanning electron microscopic image for a 13.6 μm sample of boron spherical particles of FIG. 4.
Figure 5C:
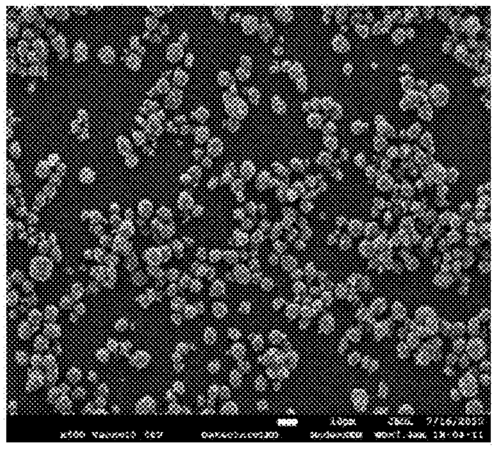
FIG. 5C is a scanning electron microscopic image for an 8.8 μm sample of boron spherical particles of FIG. 4.

FIG. 5A is a scanning electron microscopic image for a 42.8 μm sample of boron spherical particles of FIG. 4, FIG. 5B is a scanning electron microscopic image for a 13.6 μm sample of boron spherical particles of FIG. 4, and FIG. 5C is a scanning electron microscopic image for an 8.8 μm sample of boron spherical particles of FIG. 4. Each of the images of FIGS. 5A-5C was taken at the same magnification, with a scale bar of 10 μm.

The materials and methods of the present disclosure are described in greater detail below. While the examples provided herein discuss the use of specific compounds and materials, it should be understood that the present disclosure could employ other suitable compounds and/or materials. Similar quantities and/or measurements may be substituted without altering the examples embodied below.

In some embodiments, a shaker mill can be used. For example, during experimentation, a SPEX Certiprep 8000 series shaker mill by SPEX SamplePrep was used. The shaker mill was used with hardened steel, 50-mL flat-ended milling vials and hardened steel, and ⅜" diameter balls. The powder charge in each milling vial included elemental aluminum powder, −325 Mesh, 99.5% pure by Atlantic Equipment Engineers, and 25 μm, 99+% pure copper (II) oxide by Sigma-Aldrich. A mixture of 3 mL of hexane, 99.5% pure by Sigma Aldrich and 1 mL of acetonitrile, 99.5% pure by Alfa Aesar was used as the process control agents (PCA). Each vial was charged with 5 g of powder including 2.37 g of aluminum and 2.63 g of copper oxide, and 4 ml PCA. 25 g of milling balls were added to the vial, the vial was loaded and sealed in an argon-filled glovebox, and was installed in the shaker mill. The milling time was selected as 30 min. After milling, the milling vials were transferred inside an argon-filled glovebox, opened, and the powder was separated from the milling balls and stored in a separate jar filled with hexane. Samples of the powder were removed and handled in air for further characterization in electron microscopy.

In some embodiments, a planetary mill can be used. For example, during experimentation, a Retsch 400 PM planetary mill by Retsch GmbH was used. The planetary mill was used with hardened steel, custom made 175-mL milling vials and hardened steel, ⅜" diameter balls. The planetary mill was operated at 350 RPM, with the direction of rotation alternating every 15 min. The powder charge in each milling vial included elemental aluminum powder, −325 Mesh, 99.5% pure by Atlantic Equipment Engineers, and 25 μm, 99+% pure copper (II) oxide by Sigma-Aldrich. A mixture of 18 mL of hexane, 95% pure by Sigma Aldrich and 6 mL of acetonitrile, 99.5% pure by Alfa Aesar was used as the PCA. Each vial was charged with 30 g of powder including 14.25 g of aluminum and 15.75 g of copper oxide, and 24 ml PCA. 90 g of milling balls were added to the vial. The vial was loaded and sealed in an argon-filled glovebox and was installed in the planetary mill. The milling time was selected as 60 min. After milling, the milling vials were transferred inside argon-filled glovebox, opened, and the powder was separated from the milling balls and stored in a separate jar filled with hexane. Samples of the powder were removed and handled in air for further characterization, including electron microscopy, x-ray diffraction, differential scanning calorimetry, and ignition experiments.

As a further example, a Retsch 400 PM planetary mill by Retsch GmbH was used. The planetary mill was used with hardened steel, custom-made 175-mL milling vials and hardened steel, ⅜" diameter balls. The planetary mill was operated at 350 RPM, with the direction of rotation alternating every 15 min. The powder charge in each milling vial included elemental aluminum powder, −325 Mesh, 99.5% pure by Atlantic Equipment Engineers, and 99.5% pure iron (III) oxide by Alfa Aesar. A mixture of 18 mL of hexane, 95% pure by Sigma Aldrich and 6 mL of acetonitrile, 99.5% pure by Alfa Aesar was used as PCA. Each vial was charged with 30 g of powder including 17.25 g of aluminum and 12.75 g of iron oxide, and 24 ml PCA. 90 g of milling balls were added to the vial. The vial was loaded and sealed in an argon-filled glovebox and was installed in the planetary mill. The milling time was selected as 60 min. After milling, the milling vials were transferred inside argon-filled glovebox, opened, and the powder was separated from the milling balls and stored in a separate jar filled with hexane. Samples of the powder were removed and handled in air for further characterization, including electron microscopy, x-ray diffraction and ignition experiments.

As a further example, a Retsch 400 PM planetary mill by Retsch GmbH was used. The planetary mill was used with hardened steel, custom-made 175-mL milling vials and hardened steel, ⅜" diameter balls. The planetary mill was operated at 350 RPM, with the direction of rotation alternating every 15 min. The powder charge in each milling vial included elemental aluminum powder, −325 Mesh, 99.5% pure by Atlantic Equipment Engineers, and 0.8 μm, 95% pure boron by SB Boron. A mixture of 18 mL of hexane, 95% pure by Sigma Aldrich and 6 mL of acetonitrile, 99.5% pure by Alfa Aesar was used as PCA. Each vial was charged with 20.15 g of powder including 14.25 g of aluminum and 5.90 g of boron, and 24 ml PCA. 90 g of milling balls were added to the vial. The vial was loaded and sealed in an argon-filled glovebox and was installed in the planetary mill. The milling time was selected as 60 min. After milling, the milling vials were opened inside a chemical-fume hood and the powder was separated from the milling balls and stored in a separate jar filled with hexane. Particle size and morphology of the powder was observed under an optical microscope.

Ball milling of blended starting powders in the presence of PCA includes immiscible liquids having different surface energies of interaction with the solid powder particles, leading to formation of a suspension of PCA and yields round composite particles with dimensions determined by the sizes of the droplets in the suspension. In each particle, components being milled are trapped inside the suspension droplets during mixing. The scale of mixing and/or porosity of the produced spherical composite powder particles can be adjusted by altering, e.g., milling conditions, the type and/or properties of liquids used to prepare PCA, solid-to-liquid ratio when loading the milling vials, combinations thereof, or the like. Varying the sizes of the suspended droplets and their concentration can also allow for control of the size distribution of the produced spherical composite particle.

The effect of PCA including combined immiscible liquids, hexane and acetonitrile, was explored on the formation of composite thermite particles with aluminum (Al) as a fuel and copper(II) oxide (CuO) as an oxidizer. Although thermite particles were prepared, it should be understood that other composite materials could be prepared as the spherical particles of the present disclosure. Examples include pharmaceutical composites including an active pharmaceutical ingredient combined with a filler or sweetener, a drug combined with polymer, or energetic composites including inorganic reactive materials, such as metals and alloys. For example, aluminum, boron, and nickel-aluminum alloy can be combined with polymer binders, such as hydroxyl-terminated polybutadiene or other binders. Additional examples include custom composites combining components with different properties, such as a refractory and low-melting metals desired for sintering specific material architectures, e.g., by additive manufacturing methods, or materials with high and low thermal or electrical conductivities, suitable for preparing functional devices.

When preparing composite thermites, many types of suitable particles, fuels, and oxidizers can be used. Examples of fuel particles include aluminum, boron, magnesium, titanium, zirconium, tantalum, or the like. Examples of oxidizers include oxides of copper, iron, molybdenum, tungsten, bismuth, manganese, or the like. Other oxidizers, such as metal fluorides, e.g., fluorides of cobalt, bismuth, nickel, or the like, can be used. Nitrates, such as sodium or potassium nitrates, iodides, such as calcium iodide, or the like, can also serve as examples of suitable oxidizers.

The thermites were previously prepared by ball milling as fully dense nanocomposite powders (see, e.g., D. Stamatis, et al., Fully dense, aluminum-rich Al—CuO nanocomposite powders for energetic formulations, Combustion Science and Technology 181 (2009), p. 97-116). However, thermites have never been prepared previously with the PCA including immiscible liquids. In particular, in contrast to previously prepared thermites using ball milling, the exemplary method involves the use of two immiscible liquids. When agitated in the ball mill, the immiscible liquids generate a suspension, with the suspended droplets and matrix liquid each interacting differently with the solid material being milled (e.g., due to different energies of surface interaction of the liquids). Simultaneously to creation of the emulsion, the composite material is produced. The composite particles accumulate inside the droplets in the produced emulsion, forming substantially spherical composite particles. The porosity and/or size distribution of the produced spherical composite powder particles can be controlled by turning the ratio of the combined fluids used as PCA and the milling conditions. During experimentation, it was observed that fine spherical composite particles were obtained, as shown in FIGS. 2A-2B and 3A-3B. Such particles were particularly prominent in the experiments with the PCA including 25% of acetonitrile and 75% of hexane.

This process has significant potential applications in multiple industries, from advanced energetics, to pharmaceuticals, to electronic materials, etc. Spherical powders are preferred commonly because of ease of handling, flowability, and other attractive properties. Being able to prepare such spherical powders without melting any of the starting components opens multiple opportunities for design of new materials and composites. A broad selection of immiscible liquids is available interacting differently with different materials, enabling fine tunability and versatility of the present invention.

During further experimentation, spherical particles with dimensions in the range of about 1-100 μm were prepared by mechanical milling of precursor materials in the presence of a blend of immiscible liquids. Microspheres of hard and ductile materials including metals (aluminum, titanium), metalloids (boron), oxides (of iron or silicon), organic compounds (melamine, sucrose), and composites (aluminum-boron, aluminum-titanium, aluminum-copper oxide, aluminum-iron oxide) were prepared. The exemplary process leading to the formation of the spheres included formation of a Pickering-Ramsden emulsion coexisting with a dense suspension of solids in the continuous phase. Milling continuously (or substantially continuously) transferred energy to the multiphase mixture, destabilizing particles located on the liquid interface. Such destabilization caused a net transport of solids from the continuous phase into the emulsion droplets where solids accumulated and formed microspheres that could be recovered after milling. The process continued until the solid loading of the droplets exceeded a limit, or until the continuous phase suspension was depleted. The limit can be achieved by a specific milling time, which can depend on the agitation intensity used during milling. The agitation can be affected by the rate of vibration of the vials in the shaker mill, the rate of rotation of the vials in a planetary mill, and by the rate of rotation of the impeller in an attritor mill. The agitation intensity can also be affected by the amount of milling media used, or by the number of milling balls loaded into the milling vials. Specific limits can be determined based on the agitation intensity, properties of the starting materials, and/or the immiscible liquids serving as the process control agent. As noted above, microspheres prepared by the exemplary method may be used in a variety of industries, including as feedstock for additive manufacturing (when flowability attained with spherical particles is of critical importance), for drug formulations, materials for joining multifunctional porous components, catalysts, membranes, or the like.

Figure 6A:
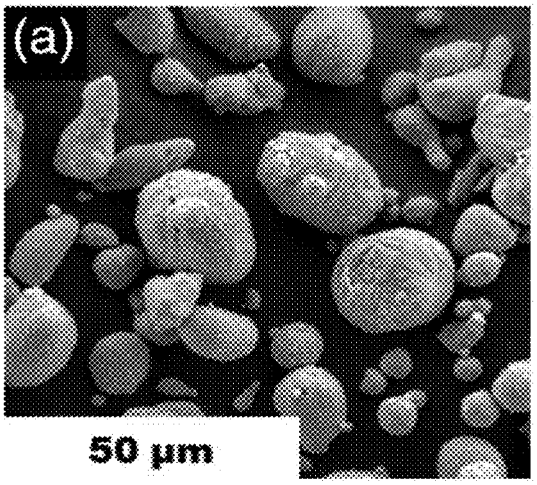
FIG. 6A is a starting material for Al and FIG. 6B is a resulting microsphere or spherical particle for Al 1.25 hours after premilling.
Figure 6B:
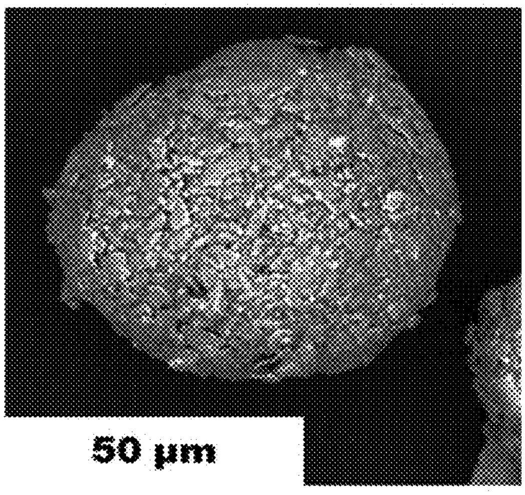
Figure 6C:
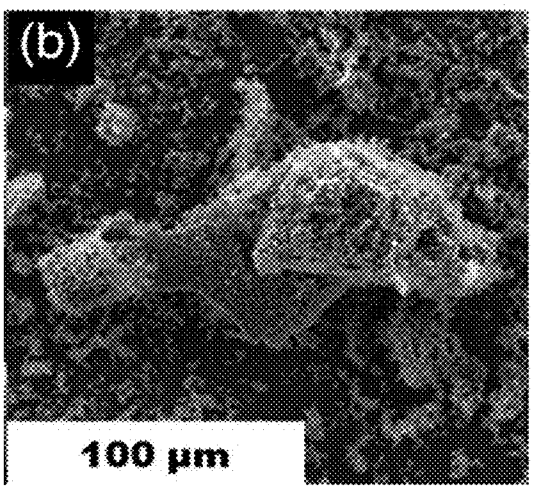
FIG. 6C is a starting material for B and FIG. 6D is a resulting microsphere or spherical particle for B 4 hours after premilling.
Figure 6D:
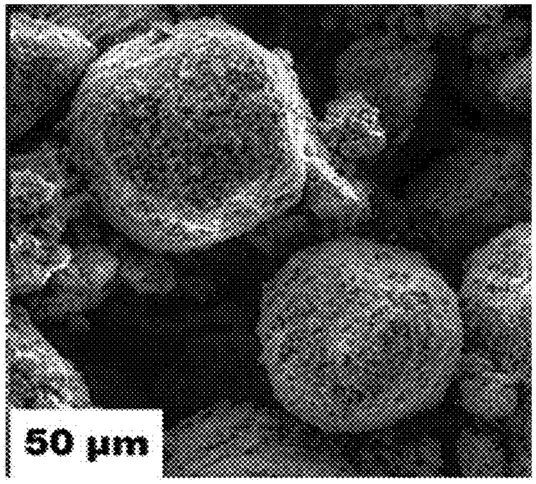
Figure 6E:
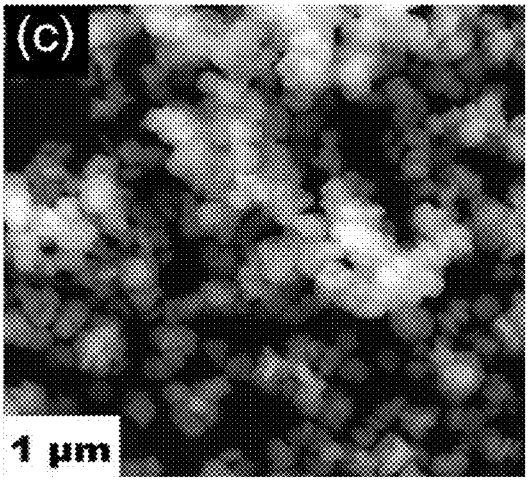
FIG. 6E is a starting material for $Fe_2O_3$ and FIG. 6F is a resulting microsphere or spherical particle for $Fe_2O_3$ 1 hour after premilling.
Figure 6F:
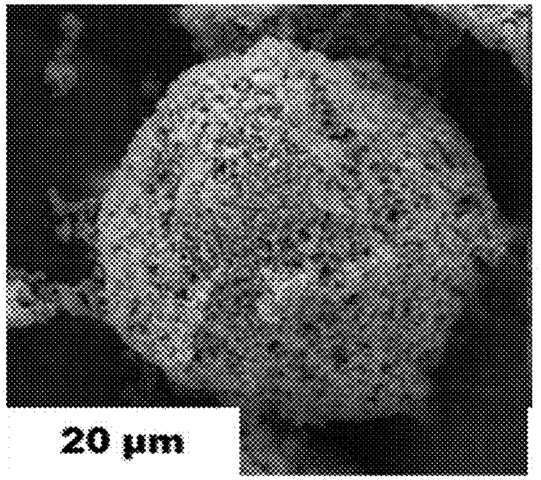
Figure 6G:
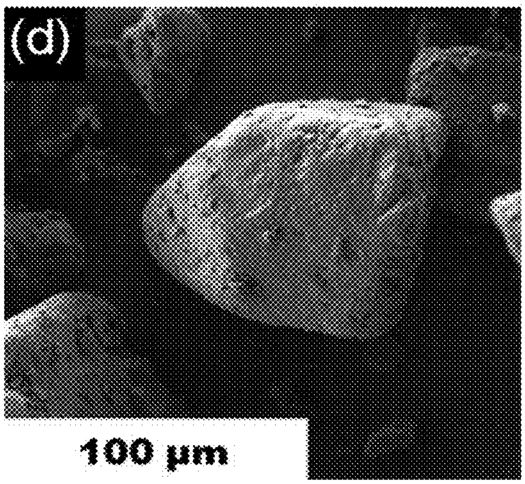
FIG. 6G is a starting material for melamine and FIG. 6H is a resulting microsphere or spherical particle for melamine 1 hour after premilling.
Figure 6H:
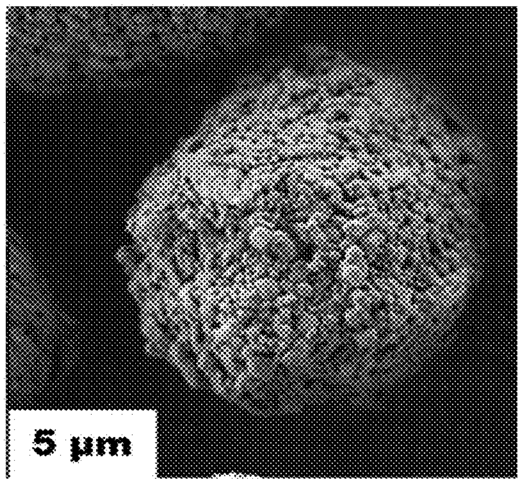

The mechanical milling in the presence of a liquid PCA including two immiscible liquids can produce nearly perfect microspheres that consist of densely compacted micro- or nanoparticles of one or more material components. Mechanical milling used to prepare the microspheres is a readily scalable, industrially flexible, and adaptable technology. Electron images of microspheres prepared by mechanical milling in the presence of a blend of hexane and acetonitrile are shown in FIGS. 6B, 6D, 6F and 6H, and compared with their precursor powders (FIGS. 6A, 6C, 6E and 6G). In particular, FIG. 6A is a starting material for Al and FIG. 6B is a resulting microsphere or spherical particle for Al 1.25 hours after premilling, FIG. 6C is a starting material for B and FIG. 6D is a resulting microsphere or spherical particle for B 4 hours after premilling, FIG. 6E is a starting material for $Fe_2O_3$ and FIG. 6F is a resulting microsphere or spherical particle for $Fe_2O_3$ 1 hour after premilling, and FIG. 6G is a starting material for melamine and FIG. 6H is a resulting microsphere or spherical particle for melamine 1 hour after premilling.

The microspheres consist of densely packed fine precursor particles but have a strikingly different morphology. The sizes of the spheres vary in the range of about 1-100 μm. Precursor materials tested during experimentation include metals, metalloids, oxides, and organic compounds. Mechanical properties vary from very hard (boron) to ductile (aluminum) or brittle (melamine). Hexane and acetonitrile have previously been used as PCAs for mechanical milling of energetic composites (see, e.g., Q. Nguyen, et al., Powder Technol. (2018), 327, p. 368; X. Liu, et al., Combust. Flame (2018), 195, p. 292; K. L. Chintersingh, et al., Combust. Flame (2016), 173, p. 288; M. Mursalat, et al., Adv. Powder Technol. (2019), 30, p. 1319; and J. Yu, et al., Phys. Chem. C (2016), 120, p. 19613).

The combination of such PCAs forms an emulsion that minimizes the milled material's exposure to oxygen. Composite microspheres have been previously prepared by mechanical milling, e.g., combining a metal and oxide powders and combining metal and a metalloid. For some precursors, e.g., fumed silica, the resulting spheres are fragile and tend to break upon recovery and drying. However, none of the microspheres prepared to date, including those that retain their shapes after drying, have included any binder, which can be readily added when structural integrity of the microspheres needs to be improved. The spherical particles shown in FIGS. 6A-6H consist of smaller primary particles that could represent the starting material directly, such as in the case of the iron oxide, or that could form from initially coarser starting powder, such as in the case of Al.

Figure 7A:
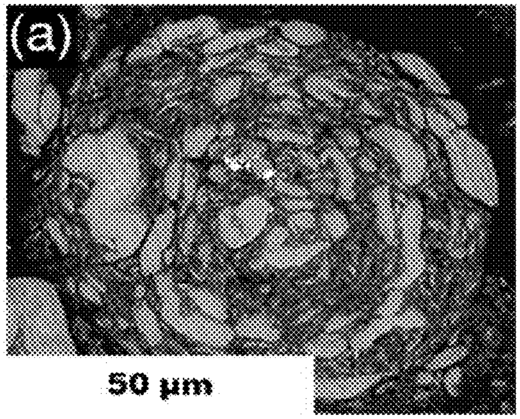
FIGS. 7A-7E are backscattered electron images of cross-sections of microspheres, including Al 1.25 hours after premilling (FIG. 7A), $Fe_2O_3$ 1 hour after premilling (FIG. 7B), Al—CuO 1 hour after premilling (FIG. 7C), Al—$Fe_2O_3$ 1 hour after premilling (FIG. 7D), and Al—B 1 hour after premilling (FIG. 7E).
Figure 7B:
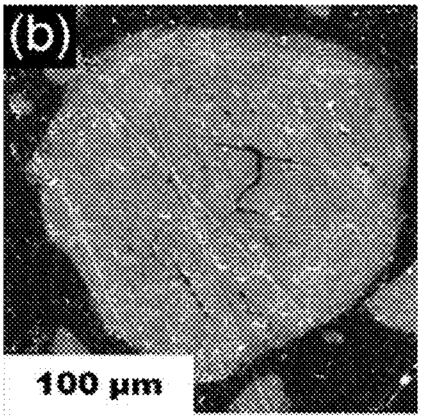
Figure 7C:
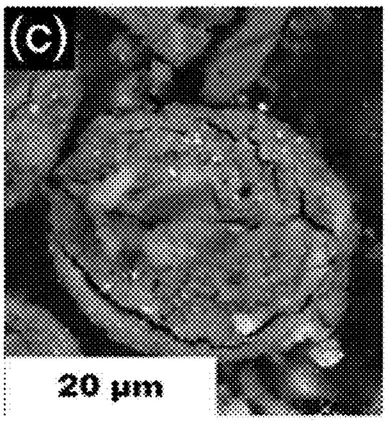
Figure 7D:
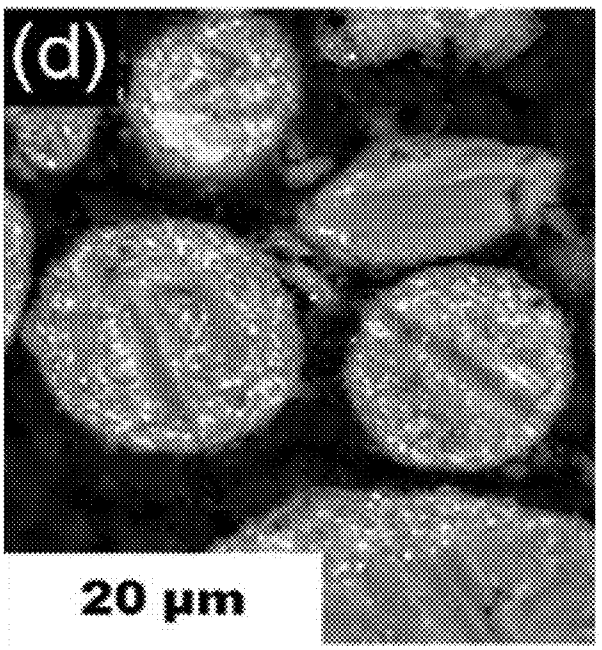
Figure 7E:
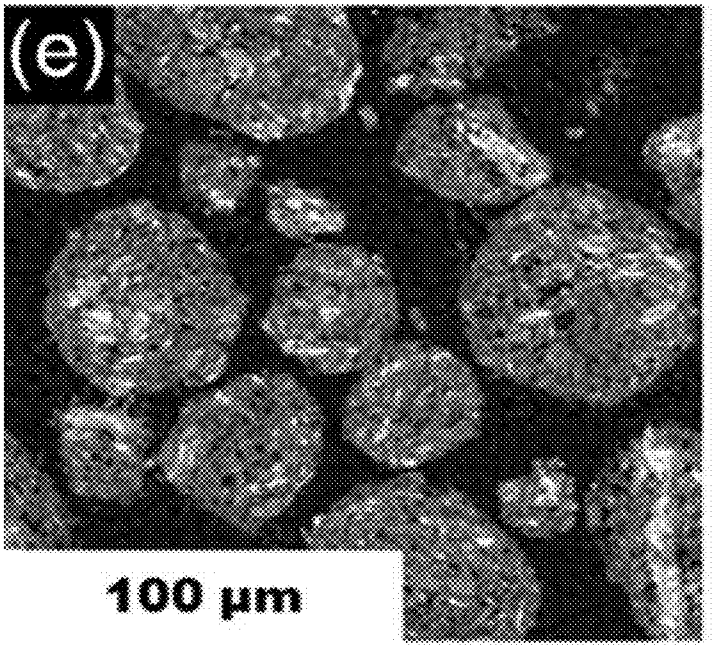

FIGS. 7A-7E show cross-sections of microspheres of Al, $Fe_2O_3$, and composite microspheres of Al·CuO, Al—$Fe_2O_3$, and Al—B. In particular, FIGS. 7A-7E are backscattered electron images of cross-sections of microspheres, including Al 1.25 hours after premilling (FIG. 7A), $Fe_2O_3$ 1 hour after premilling (FIG. 7B), Al—CuO 1 hour after premilling (FIG. 7C), Al—$Fe_2O_3$ 1 hour after premilling (FIG. 7D), and Al—B 1 hour after premilling (FIG. 7E). For the ductile aluminum, which typically forms flakes during mechanical milling, the microspheres contain packed flakes, which are, however, not fused together. The flakes packed inside the spheres are positioned at different angles to the sectioning plane, explaining a significant spread of their cross-section areas. For iron oxide, consisting of nanosized primary particles, such particles are packed to nearly full density inside the microspheres. Among the composites, the Al—CuO thermites assumed spherical shape with visible pores, whereas Al—$Fe_2O_3$ and Al—B appear denser in comparison. For some materials, porosity of the microspheres was found to depend on the milling time. Longer milling times can lead to finer and denser microspheres. However, if milled for too long, the microspheres may break.

Figure 8:
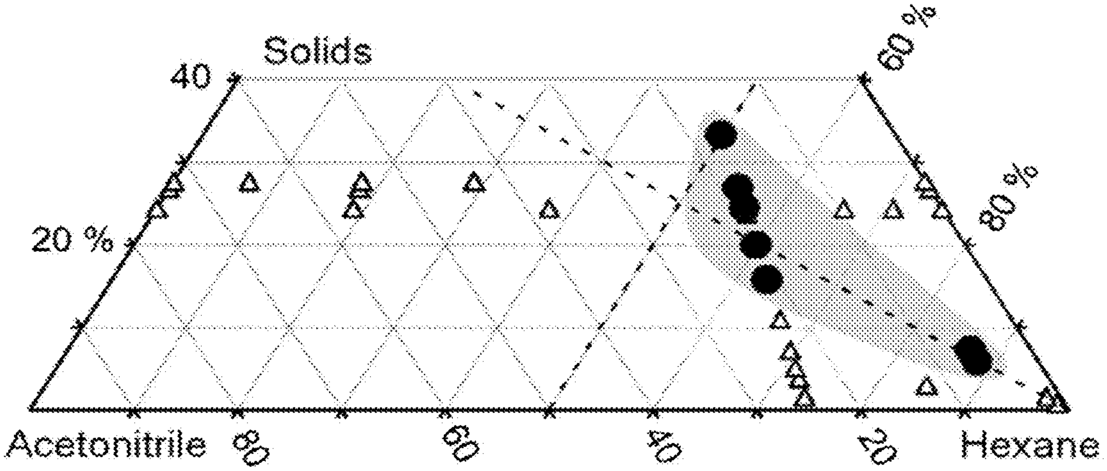
FIG. 8 is a summary compositional map of solvent compositions for each of the materials discussed in FIGS. 7A-7E, with filled symbols showing where microsphere formation was observed, open symbols showing where microspheres did not form, and dashed lines indicating 50% volume hexane and an acetonitrile/solids volume ratio of one, respectively.

Microspheres were observed with about equal volume fractions of solid powder precursor and acetonitrile, and with a hexane volume fraction greater than about 50%. An overview of solvent compositions and solid volume fractions where microsphere formation was observed is shown in FIG. 8. In the resulting emulsion, the mildly polar acetonitrile was found to typically wets the solids better than hexane. In general, particles suspended in acetonitrile tend to deagglomerate, whereas solids suspended in hexane agglomerate readily. The specific pattern of mechanical agitation did not appear to be important because spheres were observed in both shaker and planetary mills. The milling times needed to generate microspheres varied for different precursors. However, proper conditions for microsphere formation were found for all precursor powders tested.

Formation of composite spherical particles when a powder is combined with two immiscible liquids may bear similarity to the formation of Pickering-Ramsden (PR) emulsions (see, e.g., Y. Chevalier, et al., Colloids Surf. A (2013), 439, p. 23) and colloidosomes (see, e.g., A. D. Dinsmore, et al., Science (2002), 298, p. 1006; and M. Williams, et al., J. Smets, Langmuir (2014), 30, p. 2703). In such cases, emulsion droplets are stabilized by solid particles located at the liquid interface. These particles, partially wetted by both liquids, can become immobilized and may be difficult to remove from the interface. In PR emulsions, there are generally no solids in the droplet interiors. Partially filled droplets or colloidosomes were formed using double emulsions (see, e.g., M. Williams, et al., J. Smets, Langmuir (2014), 30, p. 2703; and D. Lee, et al., Adv. Mater (2008), 20, p. 3498). In contrast, the microspheres prepared by the exemplary method were filled to a much greater extent and had distinctly different structures.

In some instances, the microspheres can form as a result of high-energy, high-shear interactions of a PR emulsion and a high-concentration suspension. A PR emulsion forms quickly when two immiscible liquids are combined and agitated if both liquids partially wet the powder(s) being milled. Because the volume fraction of acetonitrile in the experimentation was always smaller than that of hexane, it was determined that acetonitrile forms droplets in the continuous phase of hexane. Considering typical mass load of powder found to be suitable to prepare the microspheres, solid particles stabilized at the liquid interface account for only a small fraction of the powder loaded in the mill. The rest of the powder remained suspended in the continuous phase. The resulting system including both a PR emulsion and a dense suspension in the continuous phase is unusual as compared to traditional systems.

Figure 9:
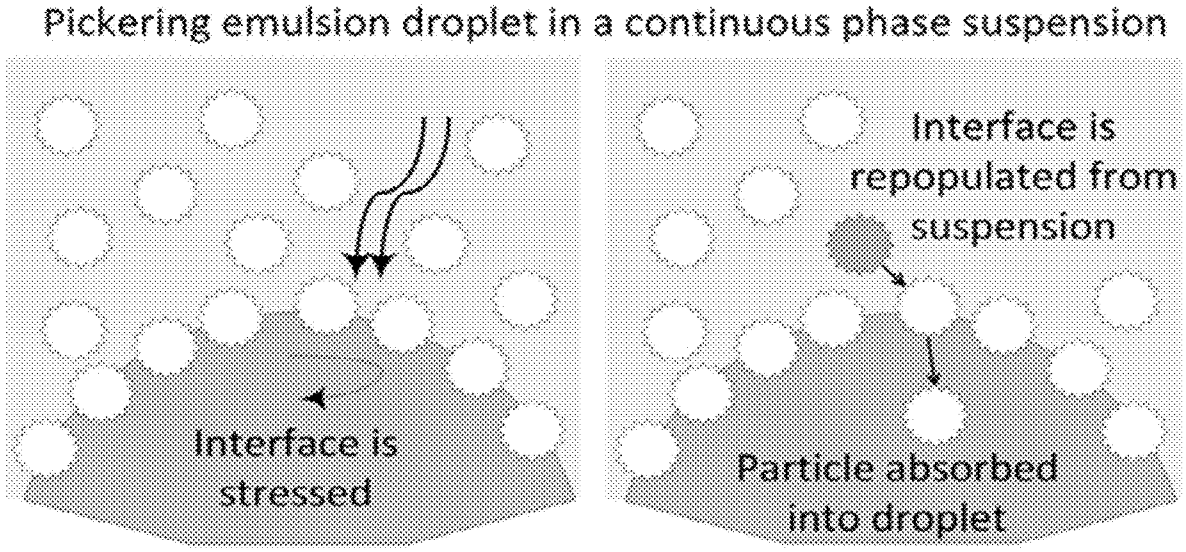
FIG. 9 is a diagrammatic representation of an exemplary method of microsphere formulation mechanism.

Milling subjects the liquid interface to significant shear stress. It has been reported that agitation generates defects and leads to removal of particles from the liquid interface, and destabilization and destruction of PR emulsion droplets take place (see, e.g., C. P. Whitby, et al., Materials (2016), 9, p. 626; C. Griffith, et al., J. Colloid Interface Sci. (2019), 547, p. 117; and S. Melle, et al., Langmuir (2005), 21, p. 2158). However, in the exemplary method, the interface is stressed in a continuous liquid densely filled with suspended particles. Such particles are expected to rapidly replace particles at the liquid interface, and to effectively "repair" any damage to the PR emulsion droplets. This process is schematically shown in FIG. 9. As the droplet surface is strained, a particle from the surface may move to the droplet interior. If the particle does not return to the surface, the remaining particles rearrange. As continued energy input removes more particles from the surface, the number density of particles at the surface decreases until the droplet either breaks up or other particles from the bulk liquid become trapped at the liquid interface. It was therefore determined that in the presence of an agitated, densely loaded suspension, particle movement from the bulk suspension to the interface may be faster than either breakup of the droplet, or return of particles from the droplet interior to the liquid interface. As a result, solid particles accumulate in acetonitrile droplets and eventually form filled microspheres as shown in FIGS. 7A-7E, 8 and 9.

There may be both thermodynamic and rheological (kinetic) reasons supporting the exemplary mechanism of formation of filled microspheres. If the liquid inside the droplet wets the particle better than the continuous liquid, there can be an energetic benefit of transferring the particles from the continuous phase into the droplet. In addition, when the concentration of particles in the droplet is sufficiently high, capillary forces may hold these particles together.

Kinetically, particles in the continuous phase and those in droplets have different motion patterns and thus have a different likelihood of interacting with the surface. Within the continuous phase, particles follow the fluid flow, while particles in the droplet move with the droplet. With any slip between droplets and the suspension in the continuous phase, the speed of particles relative to droplets can be substantial, as expected to occur during mechanical milling. Internal flows can be much weaker than the flows in the continuous phase and increasingly impeded as more particles accumulate in the droplets. As a result, the emulsion droplets may become mechanically stable as the particles in the droplet accumulate. In addition, if the suspended particles are substantially denser than the liquid of the continuous phase, they could move by inertia, impacting droplets ballistically.

During milling, the amount of powder suspended in the continuous fluid progressively diminishes. Mechanical agitation may lead to destabilization and repair of the liquid interface as long as the concentration of the suspended particles in the continuous phase remains sufficiently high. In a batch process, once the suspension becomes used up, the droplets may break more readily. For a given powder mass load, the filled spherical particles can form in a specific time interval during processing. Once the destabilized droplets break apart, it is unlikely for the released and rather agglomerated particles to be suspended again. Instead, they may form clusters of suspended particles too large to stabilize the liquid interface and to form emulsion droplets.

Observation of any of the described processes in situ during experimentation was challenging due the complex motion of the milling containers and lack of optical access. During experimentation, two types of ball mills were used to prepare microspheres from different materials. A SPEX Sampleprep 8000D Mixer/Mill with 50 mL flatended steel vials was used to prepare aluminum-copper(II) oxide thermite microspheres. A Retsch PM 400 MA planetary mill was used to prepare microspheres of aluminum, titanium, boron, iron(III) oxide, fumed silica, and melamine, as well as composite microspheres of aluminum-copper(II) oxide, aluminum-iron(III) oxide, aluminum-titanium, and aluminum-boron. The planetary mill was equipped with custom hardened steel milling jars, designed to withstand accidental combustion of reactive composite materials, such as thermite compositions (although no such accidents occurred during the noted effort, where liquid PCA also served as a coolant). Samples were milled at 350 RPM with 90 g (25 g for the shaker mill) of 9.525 mm (⅜ 00) diameter hardened steel balls, typically for 1 hour. Milling time for selected materials (aluminum, titanium, boron, and iron oxide) varied up to 4 hours.

During experimentation, the starting materials included powders of aluminum and titanium (both by Atlantic Equipment Engineers, _325 mesh, 99.5%), copper oxide (Sigma Aldrich, 10 μm, more than 99%), fumed silica (Sigma-Aldrich, 99.5%), iron oxide (Alfa Aesar, _325 mesh, 99.5%), boron (SB95 by SB Boron, <1 μm, 95%), melamine (Sigma-Aldrich, 100-500 μm [est.], 99%), and food grade sucrose. For the PCAs, hexane and acetonitrile (both by Alfa Aesar, 99.5%) were used. In most experiments involving the planetary mill, each milling jar was charged with a total of 24 mL PCA. In experiments with aluminum, the total volume of PCA was 37 mL. Mixed solvent compositions ranged from 6.25 to 75 vol % acetonitrile. Milling containers were loaded in a protective argon atmosphere. A parameter found to be important for the formation of spherical particles was solid to acetonitrile volume ratio. This ratio varied from 0.06 to >99 (for milling in pure hexane). Microsphere formation was observed in the range of 0.75-2. Cross-sections were prepared by drying samples, embedding in epoxy and hand polishing using silicon carbide polishing paper.

Further experimentation was performed to determine the effect of polar and nonpolar liquid process control agents on properties of metal rich Al/CuO thermites prepared by Arrested Reactive Milling (e.g., the exemplary method). Acetonitrile and hexane, and their mixtures were used as PCA. Milling in nonpolar hexane resulted in fully dense, micron-sized composite particles of 100 nm-scale CuO inclusions in an Al matrix. Using polar acetonitrile resulted in a mixture of nano-sized, largely unagglomerated Al and CuO particles. Porous composites, agglomerated to different degrees, forming in hexane-acetonitrile mixtures. In particular, micron-sized porous spherical composite particles formed in a mixture with 25% acetonitrile. Such spherical composites result from interaction of suspended powder particles with stressed droplets of a Pickering emulsion forming when immiscible liquids serve as PCA. Despite dramatic changes in the powder morphology, all composites were reactive. Systematic differences, discussed below, were observed in their ignition temperatures and oxidation kinetics. During the below-noted experimentation, non-polar (hexane) and polar (ACN) fluids served as PCAs for preparing metal rich Al—CuO thermite powders by the exemplary method. Samples were ball-milled in pure hexane and ACN as well as in a set of their mixtures. In addition to the effect on reactions leading to ignition, pronounced changes in the morphology of the prepared materials were observed.

For sample experimentation, aluminum-rich 8Al-3CuO nanocomposite powders (with 8/3 molar ratio between Al and CuO, forming a thermite with the equivalence ratio of 4) were prepared in a Retsch PM400 planetary mill. The starting powders were −325 mesh (less than 44 mm), 99.5% pure aluminum (by Atlantic Equipment Engineers), and 25 mm, 99+% pure copper (II) oxide (by SigmaeAldrich). Process control agents (PCA) were the pure solvents hexane (Alfa Aesar, 99.5% pure) and acetonitrile (Alfa Aesar, 99.5% pure), and mixtures of the two. Table 1 in FIG. 10 shows compositions of solvent mixtures, and the assigned sample IDs.

Custom-made hardened steel milling vials were used with a capacity of 175 ml and with 17 mm thick walls, capable of withstanding high pressure in case of an accidental initiation of the thermite reaction during milling. Each vial was charged with 30 g of powder and 24 ml PCA. The amount of the PCA was selected to ensure that the entire powder charge remained submerged in the fluid. Hardened steel balls with 9.525 mm (⅜") diameter served as the milling media. A ball to powder mass ratio of 3:1 was maintained for all the samples. The vials were loaded and sealed in an Ar-filled glovebox. All samples were milled for 60 min at 350 RPM.

The particle size and surface morphology of the resulting powder samples were characterized using a LEO 1530 field emission scanning electron microscope (SEM). Carbon tape was used as a substrate during SEM imaging for as-milled powder. Prior to SEM analysis, the liquids in the samples were evaporated. Also, as-milled powders were embedded in epoxy, cross-sectioned, and imaged. Back-scattered electrons were used for imaging cross-sections to observe the compositional contrast between Al and CuO. X-ray diffraction was performed using a PANalytical Empyrean multipurpose research diffractometer. The samples were dried and exposed to air for 24 h before the XRD runs. The diffractometer was operated at 45 kV and 40 mA, using unfiltered Cu Ka radiation (1¼ 1.5438 Å). Highscore Plus software (version 3.0e) along with PDF-4 þ 2018 database was used to identify the peaks. Peak refinement based on the Rietveld method was performed to quantify the concentration of aluminum present in the samples after they were dried and exposed to air and could, therefore, partially oxidize (see, e.g., H. M. Rietveld, Rietveld method—a historical perspective, Aust. J. Phys. 41 (1988), p. 113-116). The built-in code for Rietveld analysis was used (see, e.g., T. Degen, et al., The HighScore suite, Powder Diffr. 29 (2014), p. S13-S18).

The thermite reactions were characterized by differential scanning calorimetry (DSC) and thermogravimetry (TG) using a Netzsch STA409PC thermal analyzer. The powders were loaded in an alumina crucible without removing them from liquid PCA in order to prevent their oxidation in air. The crucible with samples immersed in liquid was loaded into the analyzer. Prior to measurement, the furnace was evacuated and then flushed with argon three times. The liquid was allowed to evaporate in a flow of argon before the heating program started. The final mass was recorded when the internal balance showed a stable reading for about 10 min. This final mass ranged from 10 to 15 mg for every sample.

The experiments were performed under a flow of argon (99.998% pure, supplied by Airgas) at a flow rate of 50 ml/min. DSC traces were recorded at four different heating rates (2, 5, 10 and 20 K/min). During each run, the samples were heated twice to the maximum temperature set in the program (800° C.). Prior to the second heating, the sample was allowed to cool down from 800° C. to 50° C. The traces were baseline-corrected by subtracting the signal recorded during the second heating and then normalized by the sample mass. In selected experiments, the gas exhaust from the DSC/TG furnace was connected to the inlet of a quadrupole Mass Spectrometer (MS) by Extrel. Specific surface areas were determined using an Autosorb iQ (model no: ASIQM000000-6) BET by Quantachrome Instruments. Samples were degassed at 30° C. for 48 h in a 0.9 mtorr vacuum.

Ignition and combustion experiments were performed. Ignition was characterized in experiments involving a thin coating of the thermite powder on an electrically heated, 0.5-mm diameter nickel-chromium (NieCr) wire. The powders were suspended in either ACN or hexane to prepare the wire coating. A thin layer of the suspension was deposited on the wire using a small brush. The solvent was dried off the coated wire prior to each run. Rechargeable large-cell 12-V batteries by McMaster Carr were used as the source of DC voltage. One, two, and three batteries were connected in series, resulting in heating rates of 4160±310 K/s, 17200±1600 K/s, and 34700±1500 K/s, respectively.

The ignition time was recorded simultaneously by a MotionPro 500 high-speed video camera and a photodiode based on optical emission. The temperature of the heated powder was not measured directly but inferred from the measured filament temperature. An infrared pyrometer including a germanium switchable gain detector (PDA30B2 by Thorlabs) coupled with a fiber optics cable and a lens was focused on an uncoated portion of the wire to obtain the wire temperature as a function of time. A Rigol DS1054Z digital oscilloscope was used in order to record the photodiode and pyrometer readings. The pyrometer was calibrated in the temperature range of 300–950° C. using a BB-4A black body emission source by Omega Engineering.

A spark induced constant volume explosion (CVE) experiment was performed to measure pressure release during thermite reaction. A custom-made, miniature steel combustion chamber (180 ml) with an in-built pin-electrode was used for the experiment. The electrode's tip was located approximately 1 mm above the surface of the powder sample placed in the chamber. The powder was placed in a 0.635-mm-deep, 3.05-mm-diameter cylindrical cavity in a grounded brass plate mounted inside the spark chamber. Mass of the powder loaded into the sample holder varied in the range of 1-12 mg. A capacitor was charged to 8 kV and was then discharged through the high-voltage pin electrode and the grounded powder holder. The pin electrode was connected to the positive plate of the capacitor while the negative plate of the capacitor was grounded. ESD ignition experiments were performed with different amounts of powder. The chamber was sealed properly prior to any discharge. Real-time measurements of voltage signatures produced by the sample during sparks were translated to pressure release. A factory-calibrated ICP 113B28 pressure sensor by PCB Piezotronics with a 0-50 psi pressure range was used in the experiment.

Figure 11A:
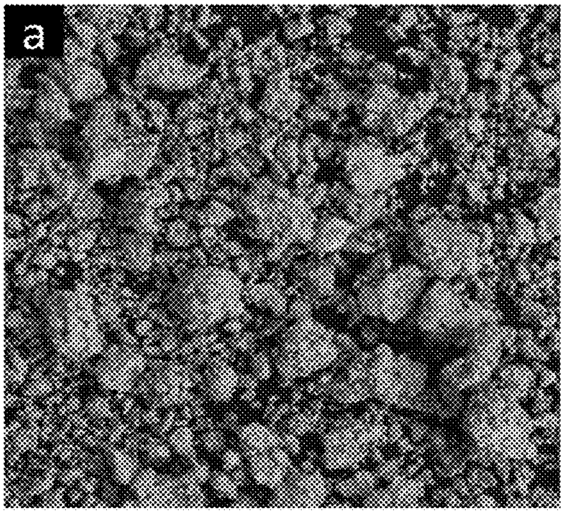
FIGS. 11A-11C are backscattered electron SEM images of 8Al-3CuO termites milled in different PCAs, including pure hexane (FIG. 11A), a solvent mixture with 25 vol-% acetonitrile (FIG. 11B), and pure acetonitrile (FIG. 11C).
Figure 11B:
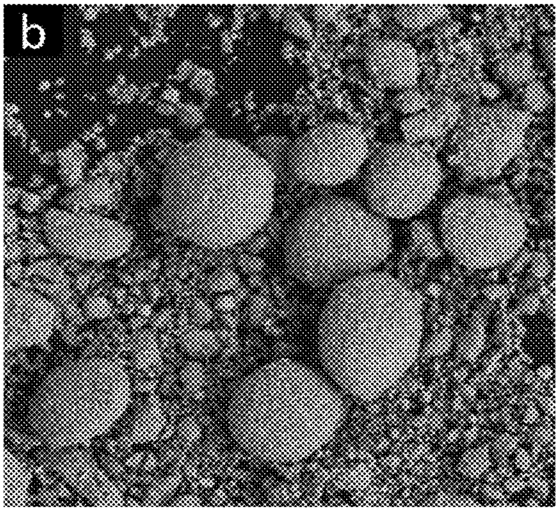
Figure 11C:
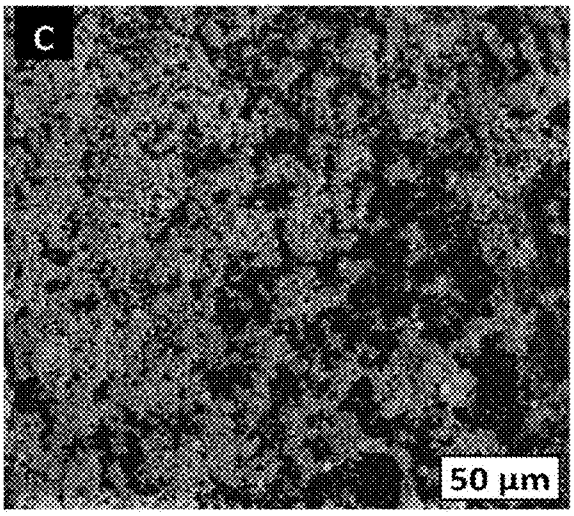

SEM images of the as-milled 8Al-3CuO powders synthesized with different PCAs are presented in FIGS. 11A-11C. For brevity, only three materials are shown. Images taken at higher magnification show that the material milled in pure hexane (A000) formed coarser composite particles (FIG. 11A). The material milled in pure acetonitrile (A100, FIG. 11C) formed a very fine powder, which appeared to contain mostly individual Al and CuO rather than composite particles. An unusual particle morphology was observed for the material milled with 25 vol-% acetonitrile (A025, FIG. 11B). This sample contained multiple, relatively coarse spherical or spheroidal particles mixed with fine particles of random shapes. To a lesser extent, formation of spheroidal composite particles was also observed for sample A012.

Figure 12A:
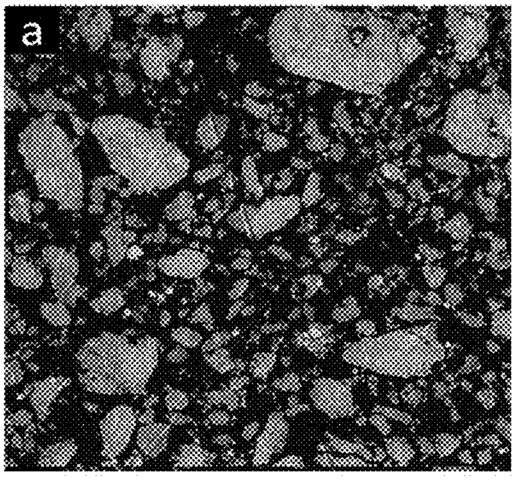
FIGS. 12A-12F are cross-sections of 8Al-3CuO composites of FIGS. 11A-11C at different magnifications, including milled in pure hexane (FIGS. 12A-12B), milled with 25% acetonitrile (FIGS. 12C-12D), and milled in pure acetonitrile (FIGS. 12E-12F), with FIGS. 12B, 12D and 12F having an inset of 1 mm.
Figure 12B:
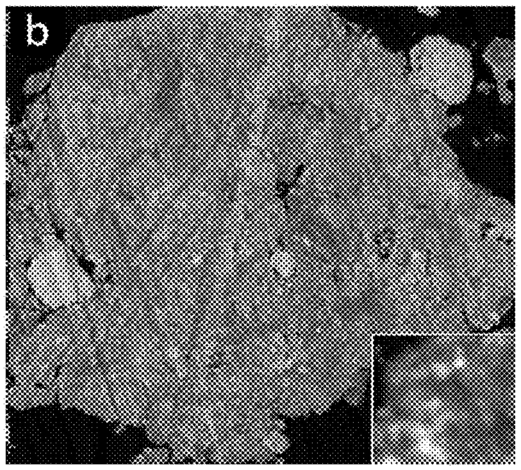
Figure 12C:
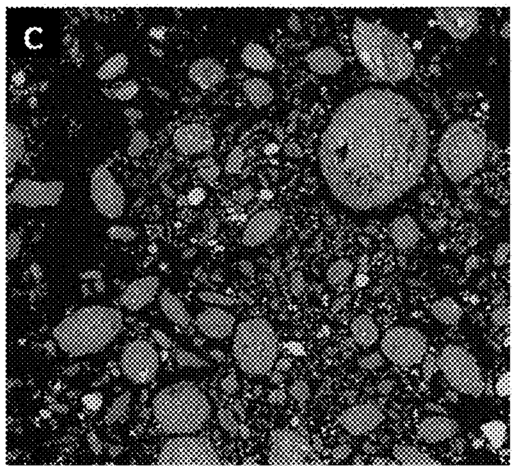
Figure 12D:
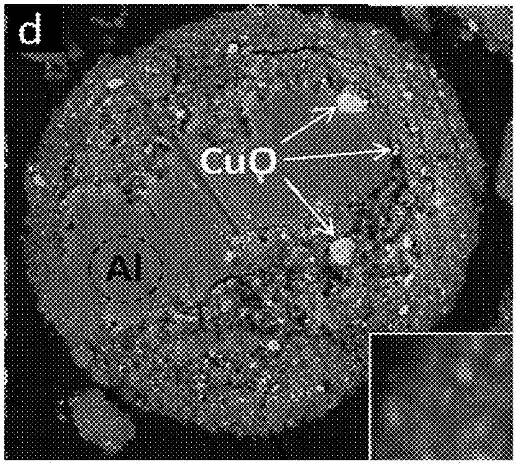
Figure 12E:
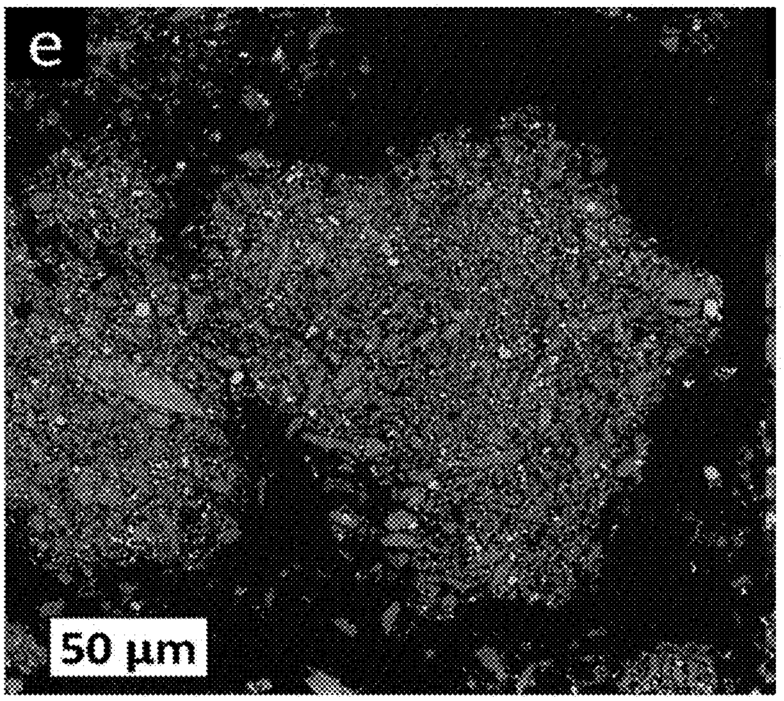
Figure 12F:
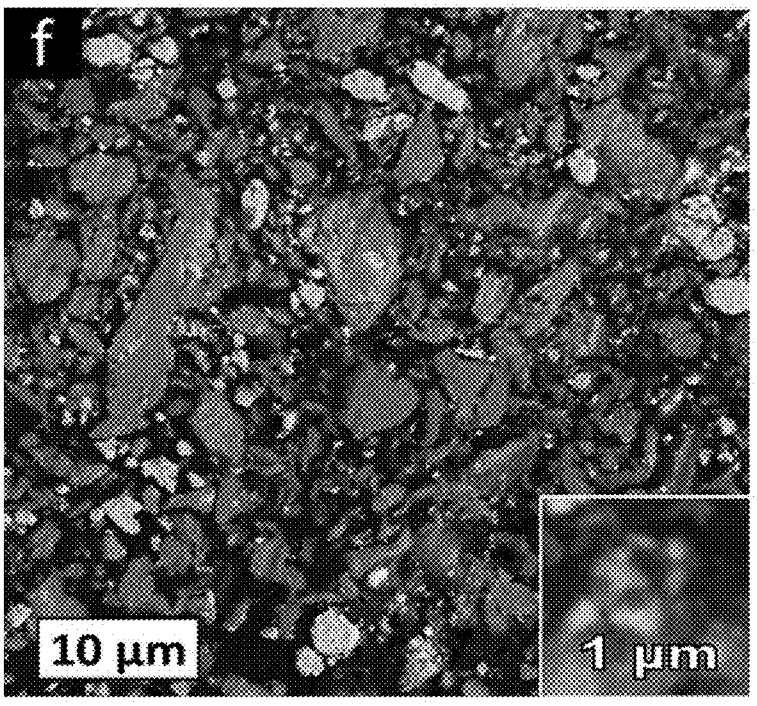

The striking differences in the powder morphologies are also visible in the images of cross-sections shown in FIGS. 12A-12F. Lower magnification images (FIGS. 12A, 12C, 12E) show overviews while the higher magnification images (FIGS. 12B, 12E, 12F) show details. The respective insets with a 1 mm edge length on the right of FIGS. 12B, 12E, 12F show details at yet higher magnification and demonstrate the nanometer scale of the lighter CuO inclusions in the medium gray Al matrix. The material milled in pure hexane (A000) contains coarser, fully dense composite particles. Aluminum appears as a darker matrix and CuO is seen as brighter inclusions, and CuO is mixed homogeneously with Al.

Consistent with the image in FIG. 11B, the material milled with 25 vol-% acetonitrile (A025) formed spherical or spheroidal composite particles with noticeable porosity and multiple cracks. The composite spheres appear to be aggregates of fully dense composite particles (as in A000), fine oxide particles (as in A100), and relatively large fragments of aluminum. The material milled in pure acetonitrile (A100), again consistent with observation from FIG. 11C, formed a very fine powder containing aluminum particles and flakes as well as CuO particles mixed with aluminum but not forming many dense agglomerates.

Figure 13A:
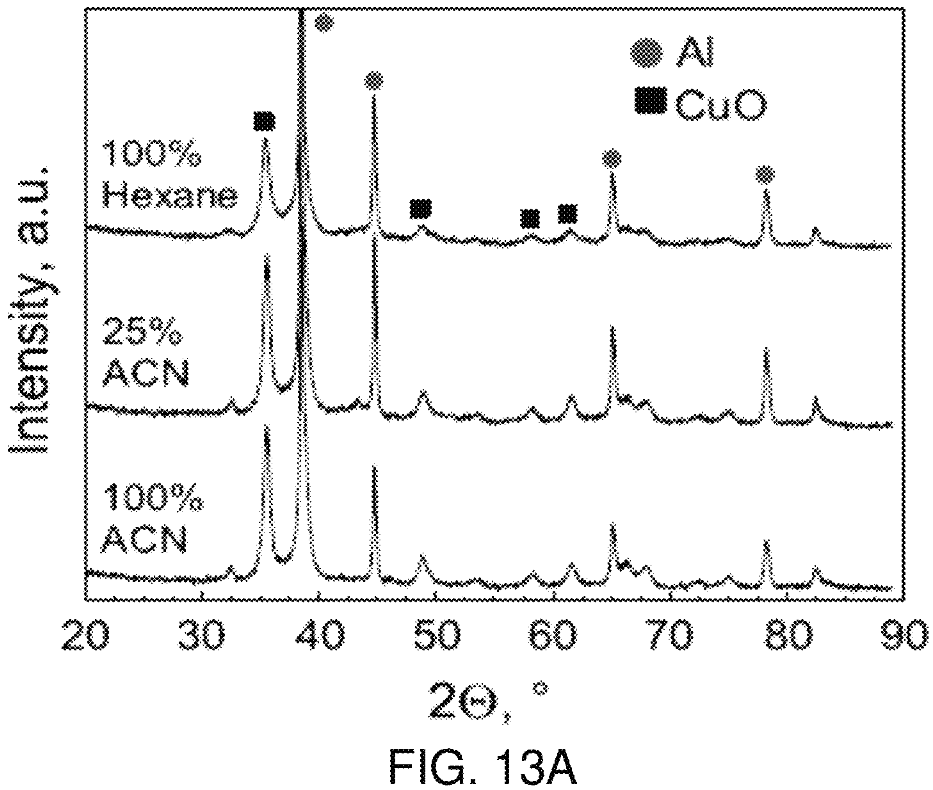
FIG. 13A shows XRD patterns of selected 8Al-3CuO composites milled with different PCA compositions.

FIG. 13A shows XRD patterns for samples A100, A025, and A000. Omitted XRD patterns were qualitatively similar to those shown. The major peaks correspond to aluminum and tenorite (a polymorph of CuO). No trace of reacted species such as $Cu_2O$ or Cu, was found in the patterns. Although amorphous $Al_2O_3$ may form during milling or upon drying the samples in air prior to the XRD measurement, it is not detectable by XRD.

Figure 13B:
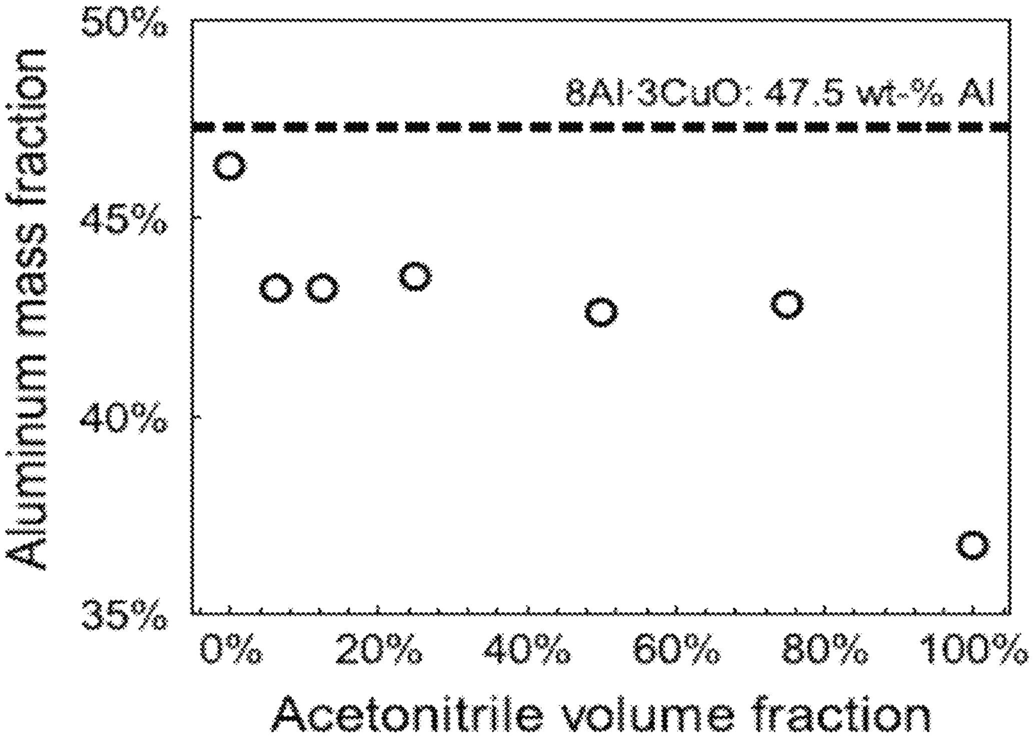
FIG. 13B shows aluminum mass fractions estimated by quantitative phase analysis of milled composites exposed to air.

While there was no qualitative difference among XRD patterns for different samples, the relative amplitude of aluminum peaks varied. A set of samples was systematically dried and exposed to air for 24 h and analyzed. Whole-pattern analysis showed variation in the mass percentage of metallic, unreacted aluminum as shown in FIG. 13B. The material milled in pure hexane (A000) contains 46.3 wt-% aluminum. The detectable aluminum content decreases to 36.7 wt-% for the sample milled in pure acetonitrile. The detectable aluminum content for samples milled in ACN-hexane mixtures ranges between 41 and 43%. The reduction in the content of metallic aluminum is likely due to oxidation in air. As noted above, the product of this reaction, amorphous or poorly crystalline $Al_2O_3$ is not detected in the XRD patterns. Nominally, for the 8Al-3CuO composite, the mass fraction of aluminum is 47.5 wt-%. Thus, A000, milled in hexane, has minimal aluminum oxidized. However, as much as 35% of the aluminum has been oxidized from A100, milled in ACN. For samples A006-A075, milled in the mixed solvents, about 15% of the metallic aluminum oxidized upon exposure to air.

Thermal analysis of the samples as also performed. In addition to the XRD results in FIG. 13B suggesting that aluminum oxidizes upon exposure to air, an indication of sample aging was observed following initial DSC experiments, using dried powder samples. In preliminary experiments, samples milled in pure hexane showed exothermic heat flow due to the thermite reaction in a first heating cycle, and endothermic peaks attributable to melting transitions in the Al—Cu binary system (primarily Al, and $Al_2Cu$, and the respective eutectic). This was expected because elemental copper is a product of the redox reaction, and should alloy with the excess aluminum in the Al-rich composite. Conversely, the material milled in 100% ACN, after exposure to air, showed no such intermetallic peak in a second heating cycle. This strongly suggested that during handling in air, a significant fraction of aluminum was oxidized so that no excess aluminum remained available to alloy with the reduced copper. This initial observation served to modify the experimental protocol. Samples were stored and loaded into the thermal analyzer under liquid, so they would not be directly exposed to air prior to measurements. With this procedure, the intermetallic melting peaks were observed for all materials during repeat heating cycles.

Figure 14A:
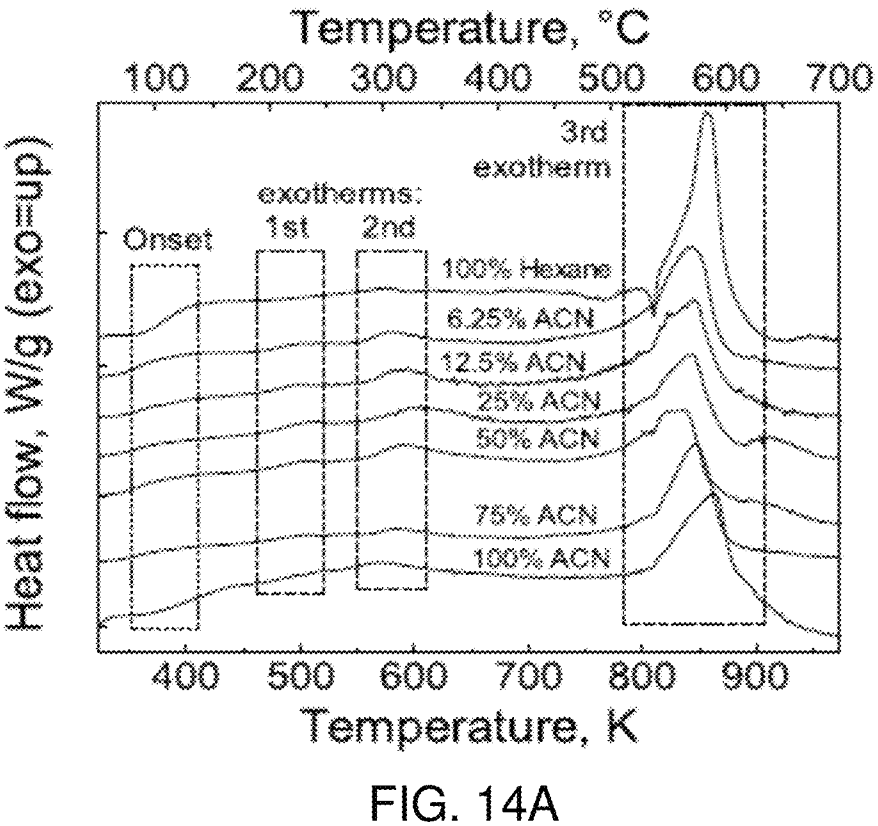
FIG. 14A shows DSC traces for 8Al-3CuO samples heated in Ar at 5 K/min.

DSC traces of the samples heated in argon at 5 K/min are shown in FIG. 14A. A broad exothermic feature begins for all samples below 400 K. All materials exhibit a relatively sharp exothermic peak between 800 and 900 K. Additionally, one or two weaker exothermic peaks can be distinguished at lower temperatures. The weak first exothermic event was only observed for samples A006-A075, prepared using mixed solvents as PCA. Eutectic melting of $CuAl_2$ (endothermic at 813 K, 540° C.) was only clearly observed for the material milled in pure hexane.

Proteus® thermo-analytical software by Netzsch was used to identify the exothermic peak temperatures. The tool detected the peak temperature analyzing the first derivative of the DSC trace with respect to temperature. The onset temperatures for the initial, low-temperature exotherms were identified by fitting tangents to the baseline and the peak slope of the DSC traces. The temperature corresponding to the intersection point of the two tangents was considered the onset temperature. Temperatures of the reaction onset and of exothermic peaks became higher at greater heating rates.

Figure 14B:
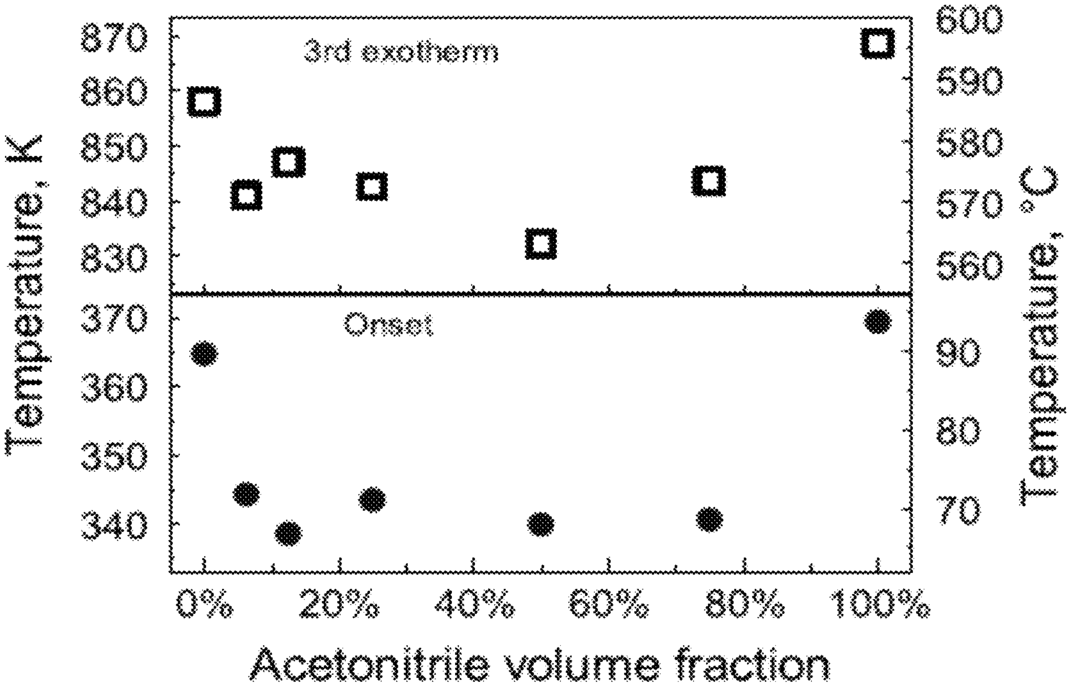
FIG. 14B shows reaction onset and peak temperatures of the strongest exotherm vs. solvent composition.
Figure 15A:
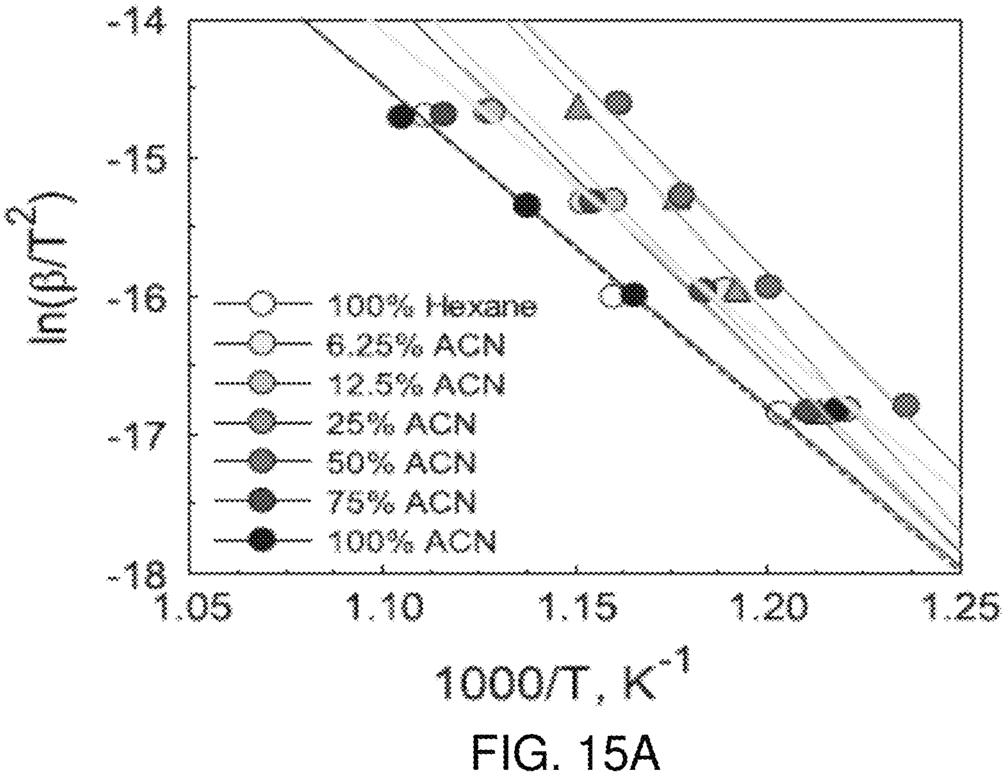
FIG. 15A shows Kissinger processing of the strongest exothermic peak temperatures observed in DSC traces.

Identified onset temperatures for the broad exothermic feature and the temperatures for the strongest exothermic peak are plotted in FIG. 14B as a function of the ACN volume fraction. Both characteristic temperatures are higher for the samples milled in pure CAN and hexane compared to the materials prepared using mixed fluids as PCA. Measurements performed at different heating rates showed that the strongest exotherm shifted consistently to higher temperatures at greater heating rates. Shifts in weaker exothermic events also occurred but were difficult to quantify. FIG. 15A shows Kissinger plots of ln(b/T2), where b is the heating rate vs. the inverse temperature (1000/T) for the strongest exothermic peaks for different samples (see, e.g., H. E. Kissinger, Reaction kinetics in differential thermal analysis, Anal. Chem. 29 (1957), p. 1702-1706).

The slopes of the straight lines fitted to each group of data points representing individual samples give an estimate for the respective apparent activation energies. These activation energies are plotted in FIG. 15B. The activation energies are near 200 kJ/mol for the material milled in hexane, and with low amounts of acetonitrile. The activation energies peak for A025, and decrease again to near 150 kJ/mol for the sample milled in pure acetonitrile.

A small mass loss was measured by TG, which accompanied weak, low-temperature exothermic reactions observed in different prepared materials. This mass loss, along with respective time derivative (DTG) and associated MS measurements are shown in FIGS. 16A-16C for sample A025. Because of non-linear change in temperature at the beginning of the heating program, FIG. 6A shows temperature, and FIG. 6B shows TG and DTG as a function of time. The initial mass loss occurs at about the same temperatures at which the DSC signal in FIG. 14A becomes weakly exothermic. The strongest peak in the DTG, corresponding to the highest mass loss rate occurs around 550 K or 300° C., where the second exotherm (see FIG. 14A) is observed by DSC. A couple of weaker features are noted in the DTG at lower temperatures, in the vicinity of the first weak exotherm marked by squares in FIG. 14A.

In the MS signals collected during DSC/TG experiments, peaks corresponding to $CO_2$ (m/z ¼ 44), $CH_3CN$ (m/z ¼ 41), and CO (or $N_2$) (m/z ¼ 28) were observed. The formation of $CO_2$ and CO can be attributed to the reaction of oxygen released by decomposing CuO with residual hexane or ACN. The $CH_3CN$ peak may be assigned to the release of residual ACN. The evolution of these peaks as a function of time is shown in FIG. 16C. The CO and $CO_2$ peaks appear to correlate with each other, although the CO peak is generally weaker and barely resolved at lower temperatures. The possibility that m/z ¼ 28 indicates $N_2$ from ACN decomposition instead of CO remains, but simultaneous evolution of CO and $CO_2$ in an otherwise inert atmosphere is more plausible. The evolution of different gas species upon heating correlates with features observed in the DTG. The first significant feature (or first step of the observed mass loss) is associated with a relatively weak first peak of $CO_2$ (and likely CO) release. The second step of the observed mass loss correlates with the release of residual ACN. Finally, the third, and the strongest mass loss step is associated with the simultaneously occurring peaks for $CO_2$ and CO.

The average total mass loss obtained from TG traces for samples heated to 1073 K (800° C.) at different heating rates are plotted against ACN volume fraction in FIG. 17. Although results are somewhat scattered, a general trend of increased mass loss with an increase of ACN volume from 0 to 25% was noted. The mass loss then decreases with further increase in ACN volume. Considering the materials as 8Al-3CuO composites with low levels of carbon contamination, a theoretical reduction of all CuO to $Cu_2O$ could lead to reaction of released oxygen with carbon, and eventual evolution of $CO_2$. This would result in an observed mass loss of about 7.1% as an upper limit of expectable mass losses during TGA. FIG. 17 is therefore consistent with at least partial reduction of the CuO contained in the composite by the reducing atmosphere (Ar) in the TG. The general trend of higher mass losses at intermediate solvent compositions suggests that for those, the CuO is more exposed to the TG atmosphere. In pure hexane, the composites are nearly fully dense and CuO is more encapsulated in the Al matrix (see, e.g., FIGS. 12A-12B), while in pure ACN the smaller particles are possibly more densely settled in the TG crucible, reducing pore space and exposure to Ar as well.

Figure 18:
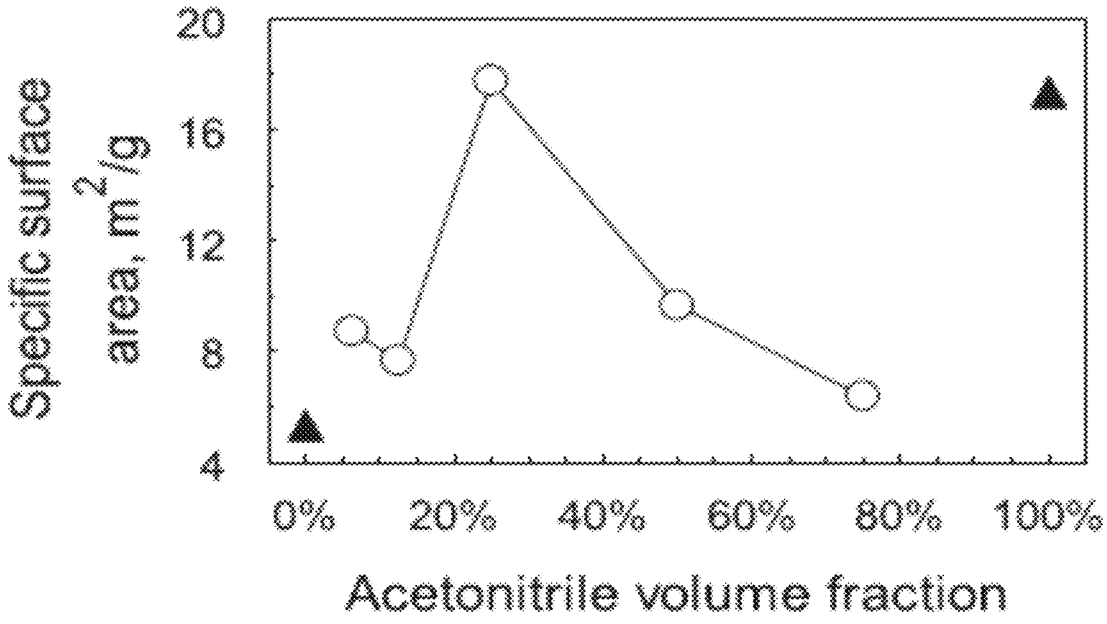
FIG. 18 shows specific surface area of composites milled with mixed solvents, with filled symbols showing the materials milled in pure solvents.

Specific surface areas are shown in FIG. 18. Composites milled with different solvent mixtures are shown as open symbols, while filled symbols show the samples milled with 100% hexane and 100% acetonitrile, respectively. The specific surface area is relatively low for the material milled in pure hexane. The specific surface area increases by <50% if small amounts of acetonitrile are used in the PCA, but then nearly quadruples for a solvent composition of 25% acetonitrile. For higher amounts of acetonitrile, the surface area decreases again. The material milled in pure acetonitrile has a surface area comparable to the sample milled in the 25% ACN mixed solvent.

Figure 19A:
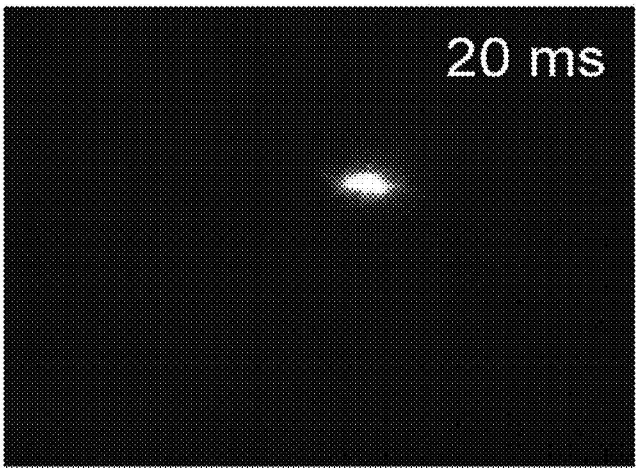
FIGS. 19A-19C show a characteristic sequence of video frames illustrating ignition of S4 (milled in 25% ACN) with a heating rate of about 34700±1500 K/s, including at 20 ms (FIG. 19A), 22 ms (FIG. 19B), and 24 ms (FIG. 19C).
Figure 19B:
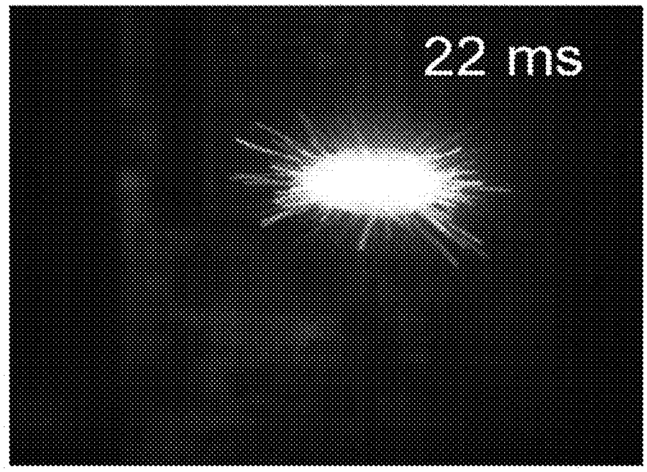
Figure 19C:
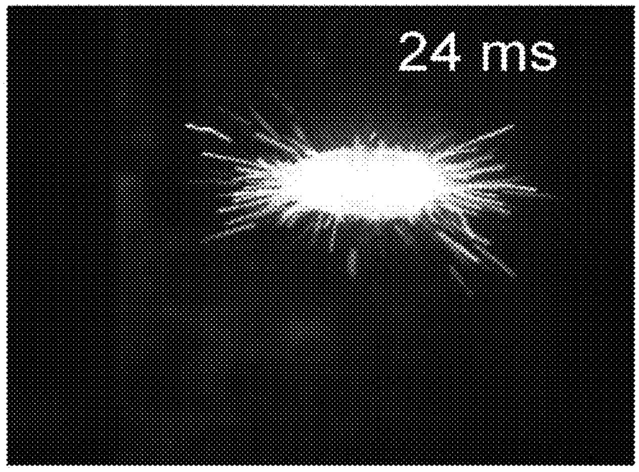

With respect to ignition, all prepared samples readily ignited as coatings on an electrically heated filament. A characteristic sequence of high-speed video frames illustrating ignition is shown in FIGS. 19A-19C. Each frame is labeled with the time elapsed from the instant the wire heating started. The wire, crossing the images vertically, is not luminous and thus remains invisible while the powder ignites and produces bright emission. Following ignition, there are bright streaks of particles ejected from the sample. Once started locally, the reaction propagated along the filament rapidly and the size of the luminous zone ejecting burning particles increased.

Figure 20A:
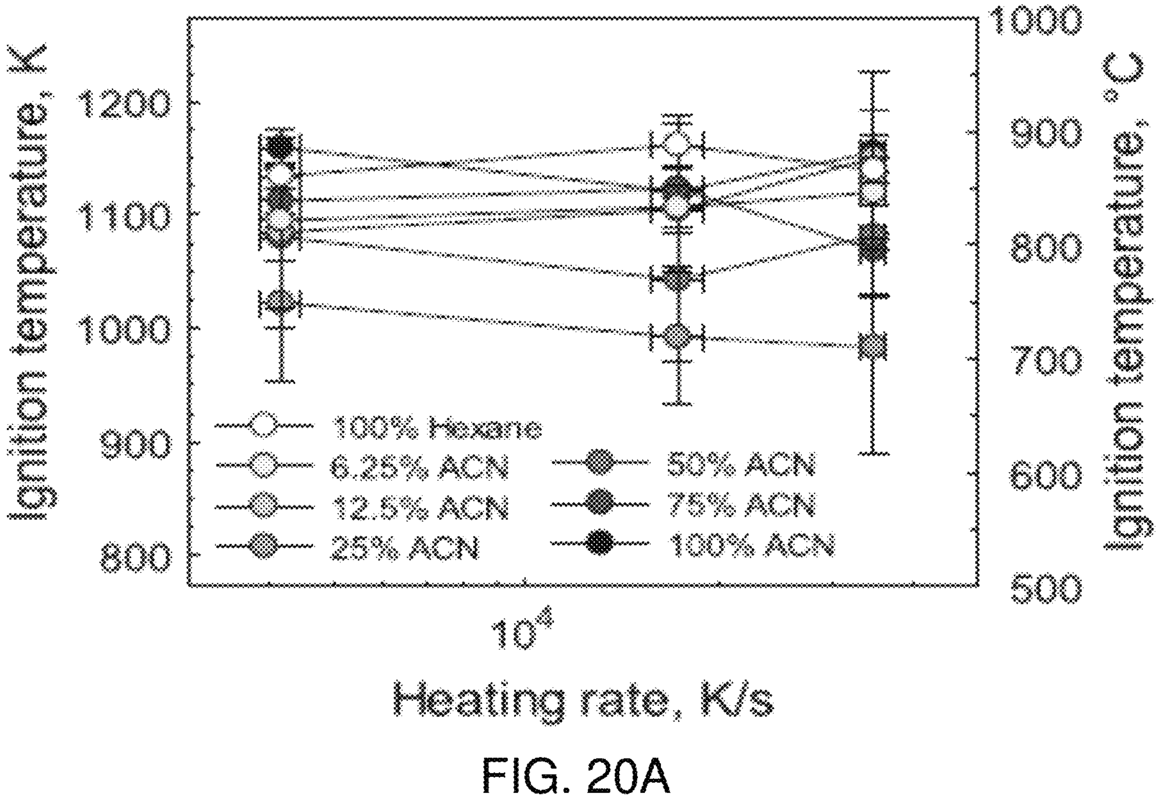
FIGS. 20A-20B show ignition temperatures of 8Al-3CuO thermites at different heating rates obtained from a heated filament experiment plotted against volume fraction of ACN.
Figure 20B:
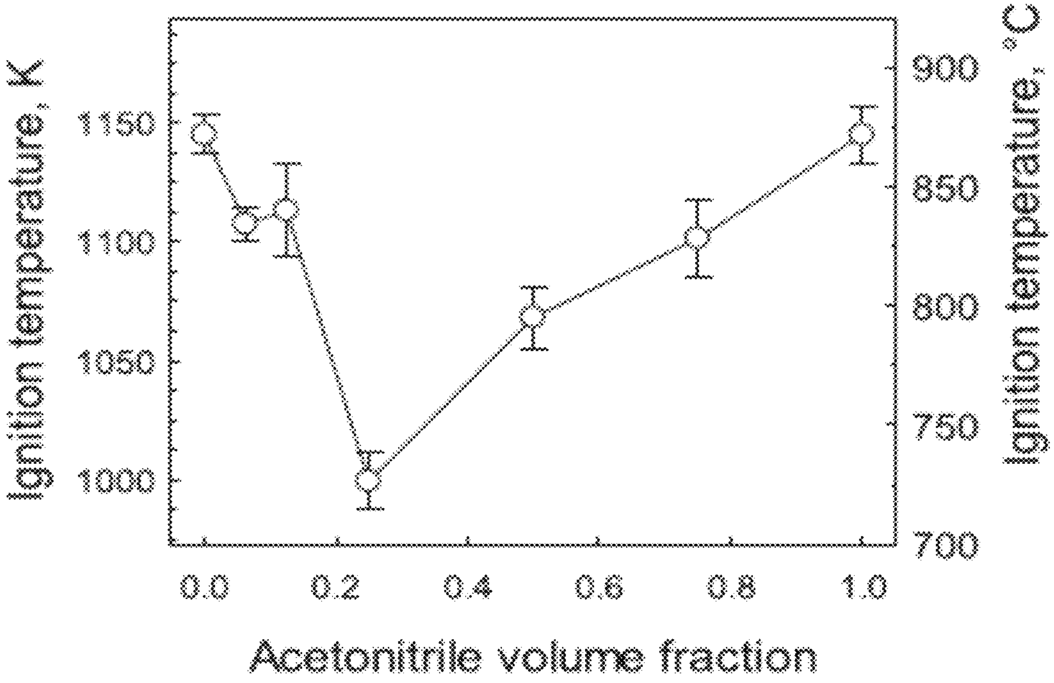

The ignition temperatures of 8Al-3CuO nanocomposites milled with different solvent mixtures, and heated at different rates are shown in FIGS. 20A-20B. FIG. 20A shows the ignition temperatures vs. the applied heating rate. The error bars represent the standard deviations for at least five repeat measurements. A linear regression of all experiments accounting for heating rate and individual solvent compositions gave an estimate of dT=d log b ¼ 0:13±13, with an uncertainty that effectively rules out any dependence of the ignition temperature, T, on the heating rate, b. The results for different heating rates were therefore averaged, and plotted vs. solvent composition in FIG. 20B. The error bars shown in FIG. 20B represent the standard deviations of the mean.

The solvent composition had a distinct effect on the observed ignition temperatures. The samples milled with mixed solvents exhibit lower ignition temperatures than both samples milled with pure acetonitrile and hexane, respectively. The average ignition temperature for A000 was 1145 K (872° C.), which decreased with increasing volume of ACN and appeared to be lowest at 1000 K (723° C.) for A025, a reduction of about 150 K. With greater ACN volumes, the average ignition temperature increased again to reach a value for the composite milled in pure acetonitrile that is nearly identical to that of the material milled in pure hexane.

Constant volume explosion (CVE) experimentation was also performed. An example of a pressure trace recorded in a typical experiment is shown in FIG. 21. Following ignition at t ¼ 0, the pressure was observed to increase for about 20 ms, which suggests the duration of the combustion event. Considering the approximate mass of the sample placed in the holder, this translates into roughly 0.432 g/s as the mass burn rate.

Maximum pressures, $P_{max}$, recorded for different 8Al-3CuO samples from CVE experiments are shown in FIGS. 22A-22B as a function of the mass loaded into the sample holder for materials prepared at different ACN/hexane ratios in PCA. In addition, the respective values of $dP/dt_{max}$ are plotted. A linear increase of pressure with mass of the powder is observed, which appears to be the same for all samples, independent of the milling conditions. Similarly, no distinct effect of milling conditions on $dP/dt_{max}$ can be observed, although these data are more scattered, and the trend is less clear than for $P_{max}$.

The results of the above-noted experimentation show that the PCA composition significantly affects the morphology and properties of the nanocomposite thermite powders. Milling with hexane yielded materials similar to those prepared earlier (FIGS. 11A, 12A and 12B) and included fully dense nanocomposite particles (see, e.g., S. M. Umbrajkar, et al., Exothermic reactions in Al—CuO nanocomposites, Thermochim. Acta 451 (2006), p. 34-43; and A. Ermoline, et al., Low-temperature exothermic reactions in fully dense Al—CuO nanocomposite powders, Thermochim. Acta 527 (2012), p. 52-58). Such particles are stable in air (FIG. 13B) and highly reactive upon heating (FIGS. 14A-14B and 20A-20B). Milling with ACN yielded a blend of fine Al and CuO particles (FIGS. 11C, 2E and 2F), which are mostly deagglomerated. It was proposed that $CH_3CN$ is chemisorbed to aluminum forming surface molecular complexes, which impede the re-consolidation during milling of fine particles produced by attrition (see, e.g., B. W. McMahon, et al., Synthesis of nanoparticles from malleable and ductile metals using powder-free, reactantassisted mechanical attrition, ACS Appl. Mater. Interfaces 6 (2014), p. 19579-19591). The same considerations appear to apply when both Al and CuO particles are milled. Assuming that the fine aluminum particles formed by milling in ACN (A100) are not oxidized, they are expected to be highly reactive upon exposure to air. Indeed, rapid oxidation is observed, leading to a loss of about 35% of the metallic aluminum (FIG. 13B). Based on this result, and assuming that the formed oxide thickness is 2.5 nm (in the range reported in, e.g., I. Olefjord, et al., Surface analysis of oxidized aluminium. 2. Oxidation of aluminium in dry and humid atmosphere studied by ESCA, SEM, SAM and EDX, Surf. Interface Anal. 21 (1994), p. 290-297; and C. Chen, et al., Measurement of oxide film growth on Mg and Al surfaces over extended periods using XPS, Surf. Sci. 382 (1997), p. L652-L657), it is estimated that the average diameter of the produced particles is close to 40 nm. Such fine particles were not resolved in FIGS. 11C, 12E and 12F, however. Using mixed hexane and ACN lead to distinctly different particle morphologies, especially for compositions close to that containing 25% of ACN (A025). Formation of distinct, porous spherical particles (FIGS. 11*b*, 12C and 12D) as a product of high energy milling was unexpected, but can be explained considering processes leading to formation of so-called colloidosomes (see, e.g., J. S. Sander, et al., Multiwalled functional colloidosomes made small and in large quantities via bulk emulsification, Soft Matter 10 (2014), p. 60-68).

Colloidosomes, hollow spheres with shells including weakly bonded fine particles form due to interfacial adsorption of colloidal particles at the liquid interface of emulsions formed in agitated immiscible binary liquids containing solid powders. The solids adsorbed at the liquid interface play the key role in stabilizing the droplets of one liquid phase emulsified in another, referred to as Pickering emulsions (see, e.g., J. W. J. de Folter, et al., Particle shape anisotropy in pickering emulsions: cubes and peanuts, Langmuir 30 (2014), p. 955-964; and Y. Yang, et al., An overview of pickering emulsions: solid-particle materials, classification, morphology, and applications, Front. Pharmacol. 8 (2017), p. 287). A solid particle stabilized at the interface of two liquids can hardly be removed from that interface. Thus, particles are accumulated at the interface until the entire surface of the droplet is populated with fine particles. When such emulsions are dried, colloidosomes form. A similar process leads to formation of spherical particles in the experiments discussed herein. An emulsion is formed upon mixing hexane and ACN. The droplet size and stability are affected by the hexane/ACN ratio as well as by the energy introduced into the emulsion by the milling tools (balls) and powder. These energies are expected to be much greater than in systems that do not involve milling tools. It is also possible that stable emulsion form only for a certain range of milling conditions, e.g., affected by the hexane/ACN ratio.

For the material milled with 25 vol-% acetonitrile, for which formation of spherical particles was most pronounced, the droplets of ACN formed in hexane. Milled particles became immobilized at the surface of such droplets, as in Pickering emulsion. Unlike traditional methods of formation of colloidosomes, however, milling tools used in the present experiments introduced a much higher energy of agitation in the three-phase system (emulsion of immiscible liquids with suspended particles), causing ballistic interaction of particles and droplets. Thus, particles stabilized at the interface could become pushed inside the droplet while being replaced by other particles impinging upon the droplets at high speeds. Particles trapped inside the droplets can no longer interact directly with the milling tools; thus, their refinement is effectively stopped. This explains the relatively coarse and less refined particles observed inside composite spheres in FIGS. 12C and 12D. This is also consistent with less rapid aging observed for such particles compared to those prepared in pure ACN (FIG. 13B). Assuming again an oxide thickness of 2.5 nm and accounting for the loss of ca. 10% of metallic aluminum (FIG. 13B), an average aluminum particle diameter of 145 nm is estimated for these powders.

Based on the results from the experimentation, it is believed that the ratio of the immiscible solvents, the relative amount of emulsified fluid (e.g., ACN), and the solid loading may need to be in certain ranges in order for the spherical particles to be effectively produced. Preliminary estimates suggest that the volume of ACN was approximately equal to the volume of the loaded solid powders for A025, for which the formation of spheres was most noticeable. The exemplary particles have a better flowability than conventional composites, and may also be advantageous when the solid reactive powder needs to be mixed with a polymeric binder and/or when the reactive materials need to be ordered or packed in certain ways.

In addition to the significant differences in morphologies of the prepared powders, there are differences in their reactivity as determined by both, thermo-analytical and ignition experiments. In DSC experiments, the intermetallic eutectic melting was only observed for the material milled in pure hexane (FIG. 14A). These results are consistent with the fully-dense structure of nanocomposite particles in A000. In other samples, chemisorbed ACN generated a different interface structure between Al and CuO, preventing or delaying reaction of Al with reduced Cu.

Results presented in FIGS. 14A-14B, 15A-15B, 17, and 20A-20B show the complex effect of PCA composition on the reactivity of obtained composites. The reactivity is affected by the scale of mixing between reactive components, uniformity of the mixing, porosity of the material, and the specific nature of the interface separating Al from CuO. Generally, all of the above parameters change for the samples prepared with different compositions of PCA. It is therefore clear that fine-tuning properties of nanocomposite thermites is achieved by varying PCA. In particular, a lower ignition temperature for A025 (FIGS. 20A-20B) combined with the higher apparent activation energy for the redox reaction for the same material (FIG. 15B) may be of interest.

Direct comparisons between the DSC and ignition experiments may not be readily made. Indeed, in ignition tests, the powders were exposed to air and thus oxidized, at least partially. This oxidation was prevented in DSC experiments using samples loaded under a protective liquid, and dried in argon inside the DSC furnace before heating. Extrapolating the trends from the Kissinger plots shown in FIG. 15A to the range of heating rates achieved in heated wire experiments points to higher temperatures than the observed ignition temperatures for all samples. Additionally, the measured ignition temperatures were not affected by the heating rates (FIG. 20A). Thus, the ignition was likely associated with a phase transformation occurring in the interfacial layer separating Al and CuO, and not by a thermally activated redox reaction. It is believed that the transformations were affected by the structure and composition of this interfacial layer, which in turn was affected by the PCA composition used. Additionally, partial oxidation of Al upon exposure to air at ambient temperature, when the prepared porous samples were dried before the tests, could have further altered properties of Al/CuO interfaces.

The effect of interface structure on the reactivity can be inferred from the results of MS analysis correlated with TG shown in FIGS. 16A-16C for A025. The release of oxidation products, CO and $CO_2$ does not correlate with release of residual ACN. One interpretation may be that hexane is adsorbed to the powder surface physically and is thus readily oxidized when oxygen becomes available as a result of CuO decomposition. Conversely, ACN is chemisorbed and is not readily reacting with oxygen. However, release of ACN upon heating may disturb the powder surface and generate defects. Such defects would be important when the sample is heated in an oxidizing environment and thus a source of oxygen other than decomposing CuO is available. The decomposition of CuO is significantly accelerated by presence of aluminum, a strong reducing agent. At the same time, the interface between Al and CuO, affected by chemisorbed ACN, in particular, may be substantially different for samples prepared with different PCA compositions. Thus, decomposition of CuO can proceed differently in samples containing aluminum functionalized by different adsorbed PCAs.

Figure 15B:
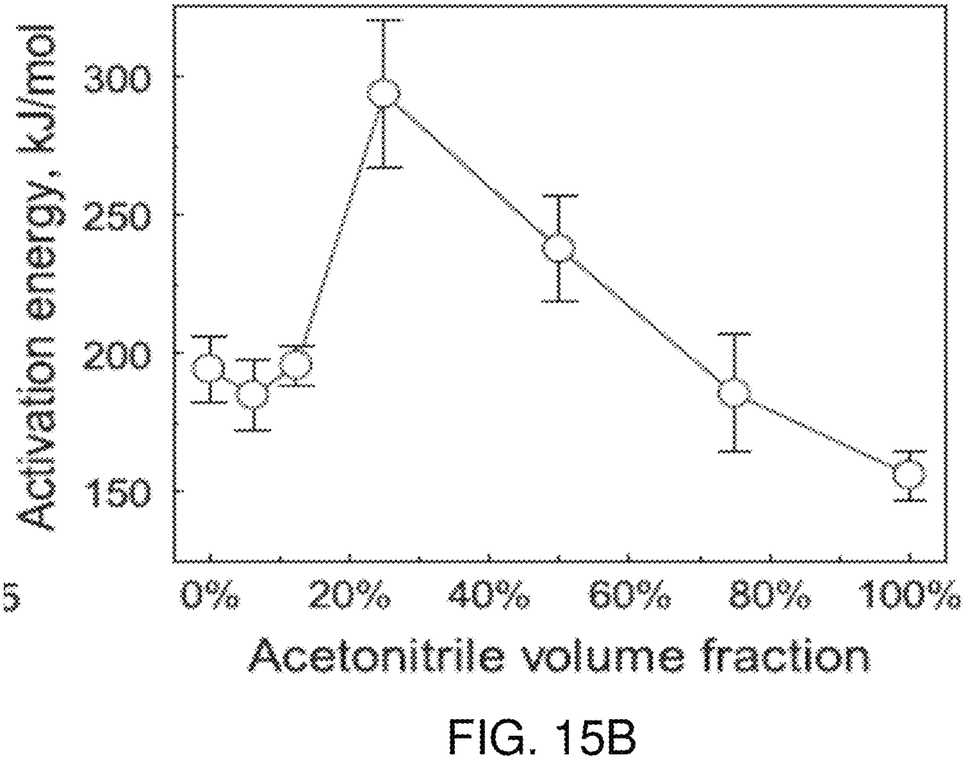
FIG. 15B shows activation energies for the reaction represented by the strongest exothermic peaks observed in DSC experiments of FIG. 14A.

The results suggest that both, ignition and reactions during thermal analysis are affected not only by properties of the interface, but also by the particles' porosity. BET surface area measurements offered a method to characterize the composites' overall accessibility to an external gas, without the rigor required to quantify pore size distributions. In this measurement, A025 stands out as the composite milled in mixed solvents with the highest surface area, and therefore presumably with the greatest porosity (FIG. 18). Porespace between the reactants Al and CuO was consistent with a higher activation barrier for the reaction, as observed by DSC (FIG. 15B). Open porosity was also consistent with a stronger evolution of gaseous species, whether due to CuO decomposition in an Ar atmosphere, or due to evaporation of solvent remnants (FIGS. 16A-16C and 17). It is therefore understood why the greatest reduction in ignition temperature is for the composite material with the greatest porosity (FIG. 20B). The surface area measurement showed the material milled in pure acetonitrile, A100, had a similar surface area as A025. However, the geometry is different, and no coherent composite particles form under these conditions. In addition, A100 is most likely aged during handling in air (FIG. 13B), and consequently did not ignite as readily as the material milled with 25 vol-% of acetonitrile. Protection of a freshly formed surface of composite materials from oxidation upon their exposure to air may be achieved by coating the prepared composites. It is possible that the lack of detectable differences between composites in the combustion experiments (FIGS. 22A-22B) could be associated with oxidation of aluminum, reducing reactivity of all prepared composites occurring for all but the traditionally prepared powder, A000. Because similar reactivity was observed in these combustion experiments for all materials despite substantially reduced fraction of crystalline aluminum for samples milled in ACN and mixed fluids, there is potential for a substantial improvement of reactive properties of the composites, when their freshly made surface is properly protected from ambient air.

Based on the results of the experimentation discussed herein, it is concluded that preparing nanocomposite 8Al-3CuO thermite powders by ARM using different liquid PCAs dramatically affected the surface morphology and structure of the prepared composites. Fully-dense composite particles including micron-sized particles with Al and CuO mixed on the scale of 100 nm were formed when the starting materials were milled in hexane. A mixture of nano-sized, largely unagglomerated particles of Al and CuO was produced when milling was performed in ACN. The surface of the formed fine Al particles was not protected with alumina and when ACN was dried, and the material oxidized in air rapidly consuming close to 20% of available aluminum. Porous composites agglomerated to a different degree were prepared when hexane and ACN were mixed in PCA. In particular, micron-sized porous spherical composite particles were prepared when the PCA contained 25% of ACN. The formation of such spherical composites is due to ballistic interaction of suspended powder particles with droplets of a Pickering emulsion produced when immiscible fluids serve as components of PCA.

Using different PCAs affects the reactivity of the prepared composites. These effects can be complex and may involve multiple changes in the prepared composites. In general, hexane and ACN are respectively physically and chemisorbed to milled powders. They can influence the structure of the formed Al/CuO interfaces and thus affect kinetics of the respective redox reactions. Ignition of the prepared dried composites upon heating was governed by a heating rate independent phase change, likely occurring in the interfacial layers separating Al and CuO.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method of preparing spherical composite powders, the method comprising:
- introducing one or more starting material powders into an agitation mill that includes one or more milling balls;
- introducing a process control agent into the agitation mill, the process control agent including at least two immiscible liquids; and
- agitating and milling the one or more starting material powders with the one or more milling balls and the process control agent with the agitation mill to produce spherical composite powders within emulsion droplets formed by the at least two immiscible liquids.

2. The method of claim 1, wherein the agitation mill is a ball mill, and the method comprises introducing one or more milling balls as a milling media into the ball mill.

3. The method of claim 2, wherein the one or more starting material powders and the process control agent are introduced into a milling vial of the ball mill.

4. The method of claim 1, wherein the at least two immiscible liquids are different from each other.

5. The method of claim 1, wherein the at least two immiscible liquids are selected from water and oil, acetonitrile and hexane, acetonitrile and heptane, acetic acid and pentane, or acetic acid and hexane.

6. The method of claim 4, wherein a first of the at least two immiscible liquids is polar, and a second of the at least two immiscible liquids is non-polar.

7. The method of claim 1, wherein the agitation mill is at least one of a shaker mill, a planetary mill, or an attritor mill.

8. The method of claim 1, comprising selecting the at least two immiscible liquids and the relative percentages of the at least two immiscible liquids prior to agitation and milling.

9. The method of claim 1, comprising varying a liquid-to-solid mass ratio between the one or more starting materials and the at least two immiscible liquids.

10. The method of claim 1, comprising introducing a surfactant into the agitation mill to tune a surface energy of the at least two immiscible liquids forming the emulsion droplets during agitation and interacting with the one or more starting material powders.

11. The method of claim 1, wherein a volume of one of the at least two immiscible liquids that forms the emulsion droplets is equal to a volume of the one or more starting material powders in the agitation mill.

12. The method of claim 1, wherein a volume of one of the at least two immiscible liquids that forms the emulsion droplets is greater than a volume of the one or more starting material powders in the agitation mill.

13. The method of claim 1, wherein the one or more starting material powders are inorganic precursor powders.

14. The method of claim 1, wherein the one or more starting material powders are organic precursor powders.

15. The method of claim 1, wherein the one or more starting material powders are a combination of inorganic and organic precursor powders.

* * * * *